(12) United States Patent
Hiraishi et al.

(10) Patent No.: US 7,214,900 B2
(45) Date of Patent: May 8, 2007

(54) ELECTRICAL DISCHARGE MACHINE POWER SUPPLY

(75) Inventors: Masakazu Hiraishi, Kyoto (JP); Masahiro Muro, Osaka (JP); Takeshi Masaki, Osaka (JP); Toshihiko Wada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 63 days.

(21) Appl. No.: 11/014,052

(22) Filed: Dec. 17, 2004

(65) Prior Publication Data

US 2006/0006150 A1  Jan. 12, 2006

(30) Foreign Application Priority Data

Dec. 19, 2003  (JP)  ............................ P2003-423546

(51) Int. Cl.
  *B23H 1/02*  (2006.01)
  *B23H 7/14*  (2006.01)
(52) U.S. Cl. .................................. 219/69.13; 219/69.18
(58) Field of Classification Search ............. 219/69.13, 219/69.18; 320/166
  See application file for complete search history.

(56) References Cited

U.S. PATENT DOCUMENTS 3,705,286 A * 12/1972 Kondo et al. ............. 219/69.13
3,812,317 A * 5/1974 De Bont et al. ......... 219/69.18
4,602,142 A * 7/1986 Itoh ........................ 219/69.13
4,806,719 A * 2/1989 Seerieder et al. ........ 219/69.13
6,169,262 B1 * 1/2001 Lee et al. ................ 219/69.13

FOREIGN PATENT DOCUMENTS

| JP | 55-48529 A | * | 4/1980 | |
| JP | 60-172419 A | * | 9/1985 | ............... 219/69.13 |
| JP | 3-190625 A | * | 8/1991 | |
| JP | 4-354621 A | * | 12/1992 | ............... 219/69.13 |

* cited by examiner

*Primary Examiner*—Geoffrey S. Evans
(74) *Attorney, Agent, or Firm*—Wenderoth, Lind & Ponack, L.L.P.

(57) ABSTRACT

An electrical discharge machining apparatus includes a work electrode adapted to support a work immersed in a working fluid, a tool electrode located opposing the work electrode with a predetermined gap therebetween, a capacitor that is connected between the work electrode and the tool electrode to provide a series of voltage pulses, a charging circuit having a power supply and a first switching element which are connected in series to the capacitor, a charge regulating circuit having a second switching element connected in series to the capacitor, and a control unit that controls the first and second switching elements, such that the first switching element turns on, and then the second switching element turns on before the first switching element turns off. Then, one voltage pulse, having a leading edge corresponding to the turning on of the first switching element and a trailing edge corresponding to the turning on of the second switching element, is generated.

9 Claims, 21 Drawing Sheets

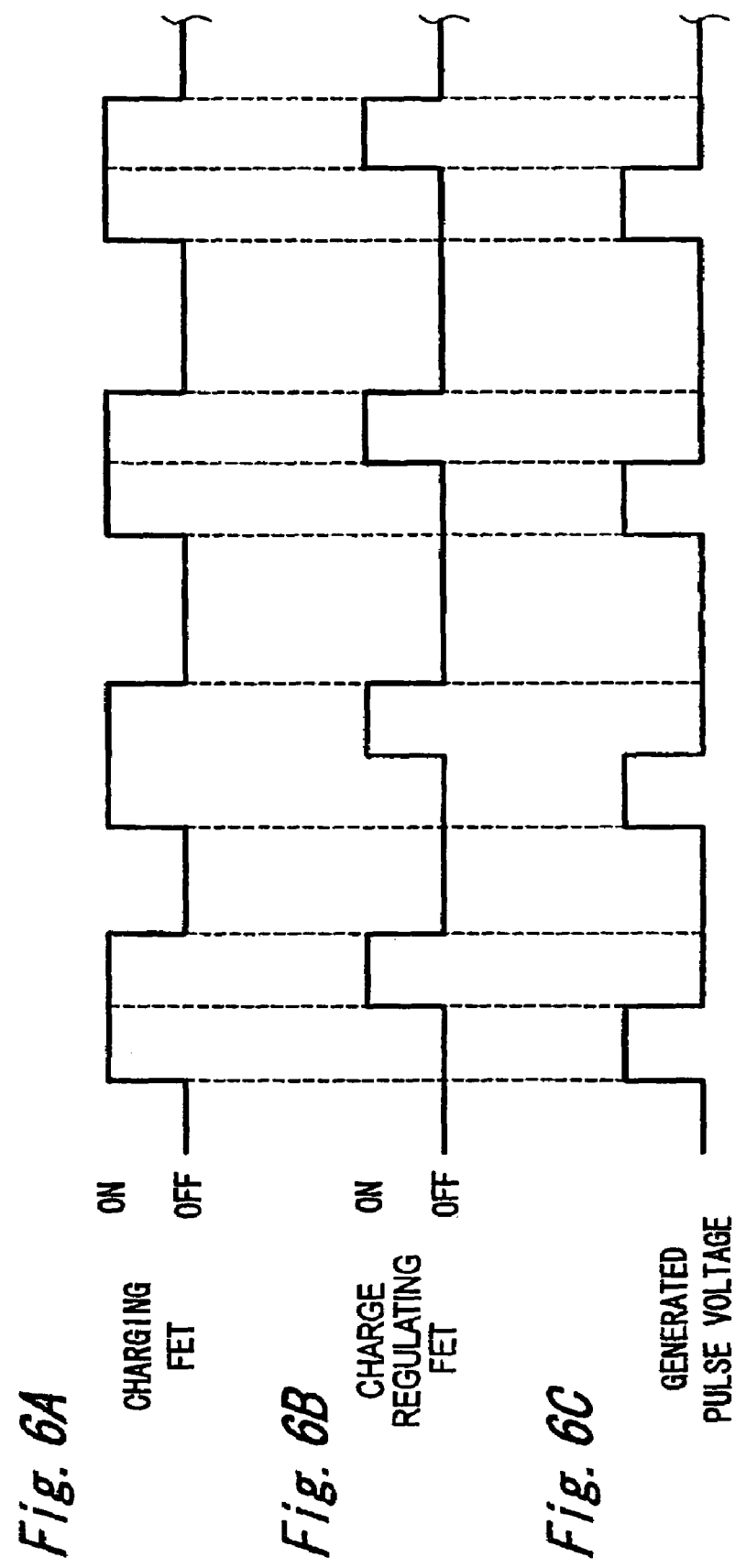

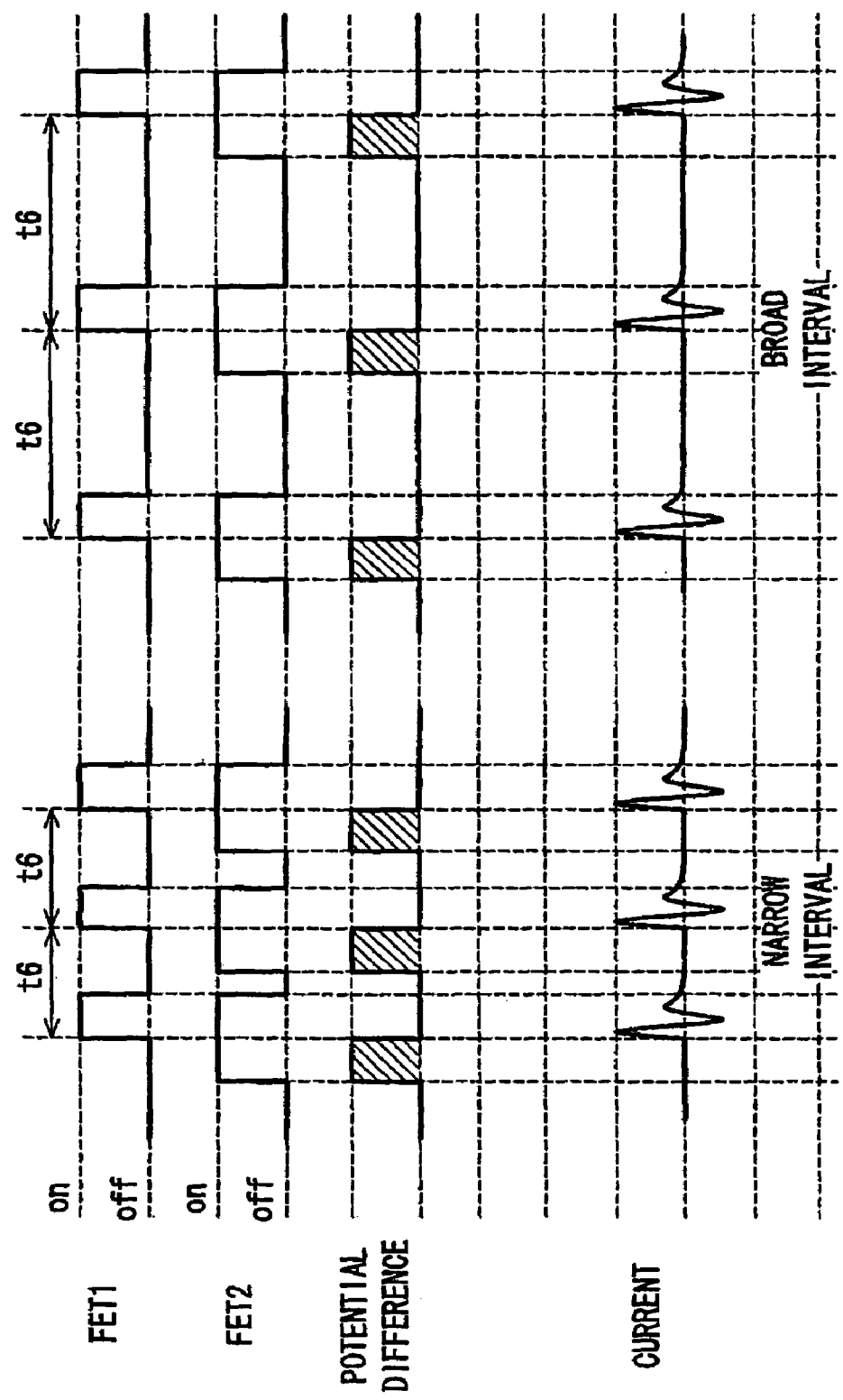

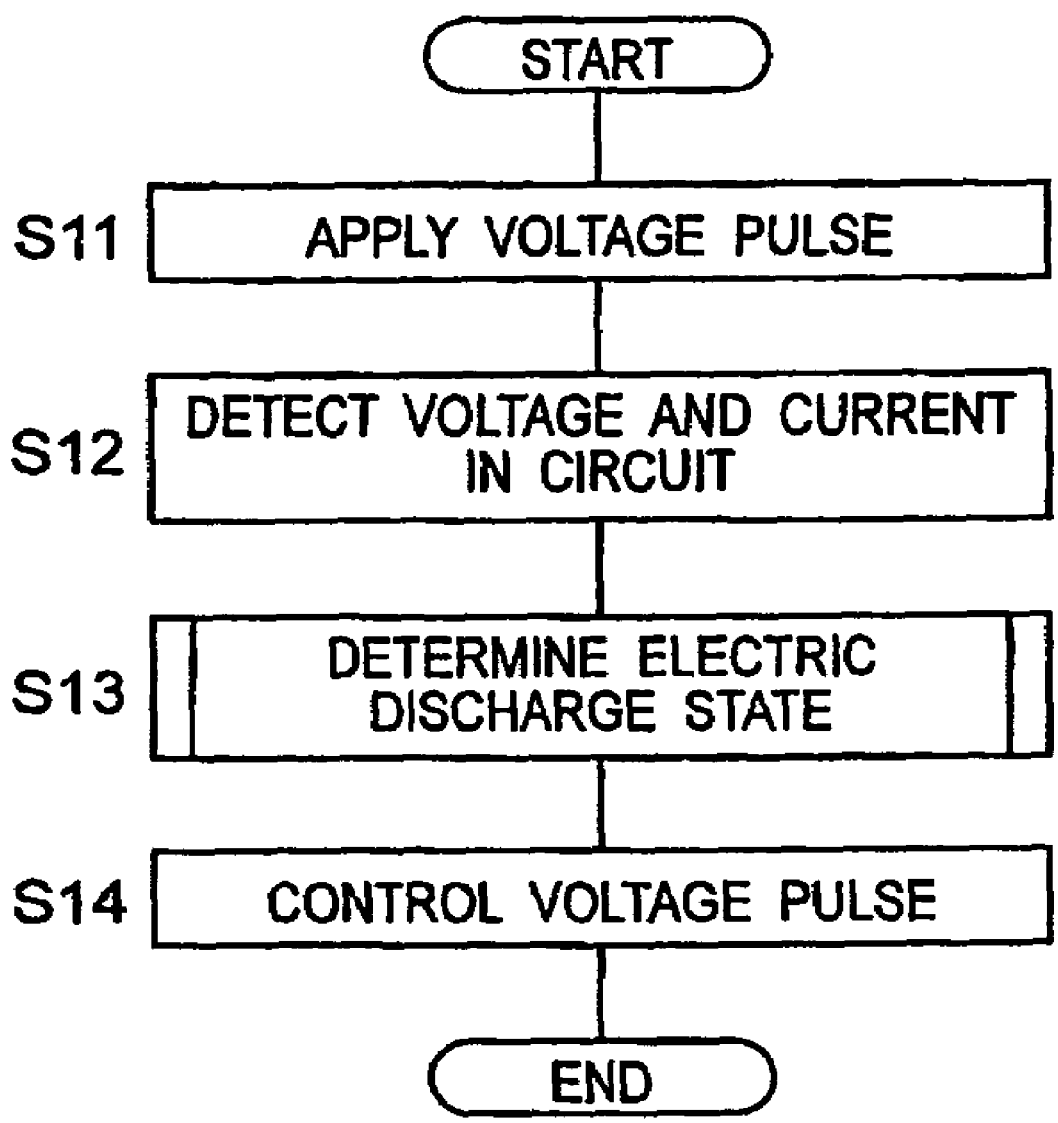

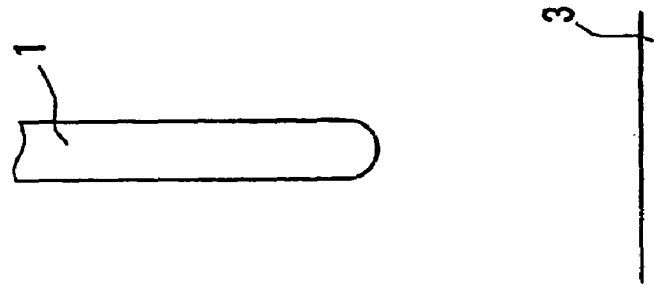
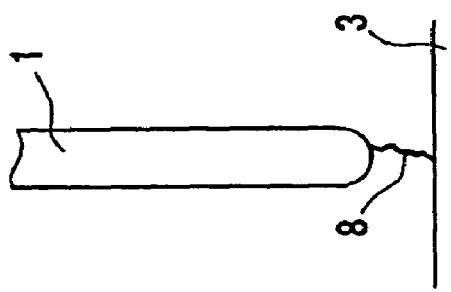
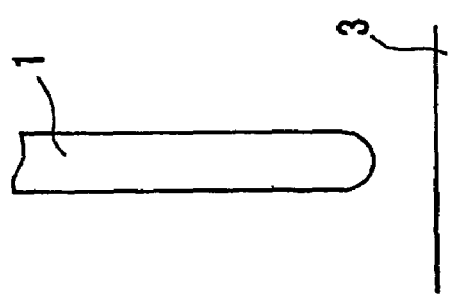
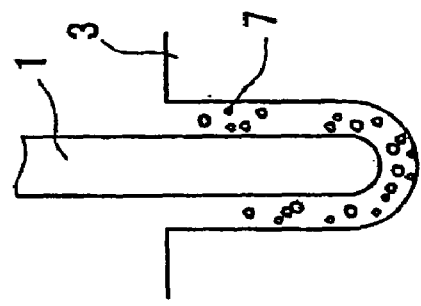
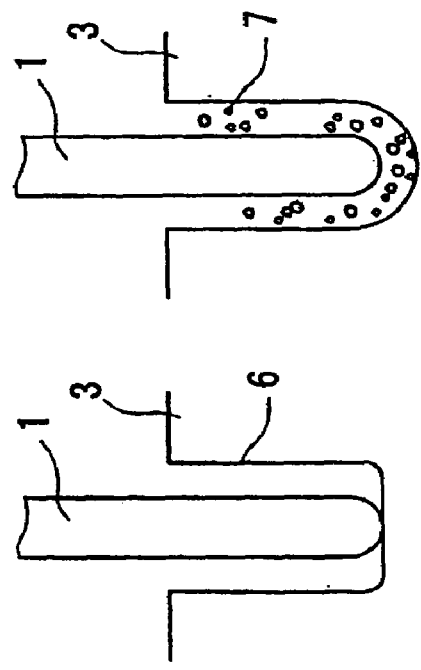

ELECTRICAL DISCHARGE MACHINE POWER SUPPLY

BACKGROUND OF THE INVENTION

1. Field of the Invention

The present invention relates to a machining apparatus and a machining method in which a work is machined by applying voltage to a microscopic gap between a tool electrode and the work to utilize electrical discharge or an electrolytic reaction generated in the gap. More particularly, the present invention relates to an electrical discharge machining method and an electrical discharge machining apparatus that are used for fine machining for forming a microscopic pore, a microscopic hole, a microscopic slit, or the like.

2. Description of the Related Art

Conventionally, the micro electrical discharge machining technology is mainly used as the method of machining a microscopic pore and a microscopic hole, for example, machining a nozzle of an inkjet printer. Recently, an ultra-fine electrical discharge machining apparatus has been developed that can make the hole have a minimum diameter up to 5 μm.

FIG. 20 is a schematic view of an electrical discharge machining apparatus 50 used for making the microscopic hole such as an ink ejection nozzle of an inkjet printer (for example, see Japanese Patent Laid-Open Publication No. H10-202432). The electrical discharge machining apparatus 50 includes a tool electrode 51 and a driving device 55 that vertically moves the tool electrode 51. A work 53 is arranged directly under the tool electrode 51. A leading end of the tool electrode 51 and the work 53 are immersed in the working fluid having dielectric characteristics such as deionized water. When a potential difference and a distance between the tool electrode 51 and the work 53 do not satisfy electrical discharge conditions, the insulating characteristics of the working fluid provides the insulation between the tool electrode 51 and the work 53.

A circuit configuration of the electrical discharge machining apparatus 50 will now be described. A capacitor 58 is connected in parallel between the tool electrode 51 and the work 53, and the capacitor 58 is connected to a rectangular-pulse power supply 61 through a charging resistor 57. The rectangular-pulse power supply 61 includes a reference pulse generator 62 that can arbitrarily set a frequency and a pulse duration. The capacitor 58 is charged in each application of rectangular pulse voltage. At this point, when the driving device 55 brings the tool electrode 51 close to the work 53, the electrical discharge is generated between the tool electrode 51 and the work 53. Because a portion subjected to the electrical discharge in the work 53 is melted and removed, a concave portion having the same shape as the leading end portion of the tool electrode 51 can be formed in the work 53.

Conventionally, oil is used as the working fluid. However, a long machining time is required because the oil has high insulating characteristics and the electrical discharge is difficult to generate. There is a fear that inflammation is caused, and thus, deionized water has been used as the working fluid in recent years. Because water is separated into an $H^+$ ion and an $OH^-$ ion through electrolysis, when the voltage is applied between the tool electrode 51 and the work 53 for a long time, ionization of the working fluid progresses to permit conduction between the tool electrode 51 and the work 53. Because the desired electrical discharge cannot be generated during the conduction, there is a problem in that the machining time becomes longer. Further, because a surface of the work is melted by heating the surface through the conduction, there is the problem in that accuracy of machining is made worse. Therefore, in the electrical discharge machining apparatus 50, the ionization of the working fluid (deionized water) is suppressed and the generation of the conduction is suppressed not by continuously applying the voltage, but by using the rectangular-pulse power supply 61 to shorten one voltage applying time.

However, in the configuration of the conventional electrical discharge machining apparatus, there are the following problems. Namely, when the electrical discharge machining is performed in the configuration shown in FIG. 20, a peak current and an electrical discharge time of the capacitor 58 are determined by the capacitance of the capacitor 58 and the resistor 57. When deionized water is used as the working fluid, because voltage is always applied between the tool electrode 51 and the work 53, the working fluid is sometimes ionized to provide the conduction before a predetermined electrical discharge voltage is applied, which results in passage of insufficient electrical discharge current. Further, the work 53 and the tool electrode 51 are reacted with each other to worsen a surface state of the work, and the accuracy of machining is not sufficiently obtained.

Conventionally, in the rectangular-pulse power supply 61, the voltage pulse is generated by turning one switching element on and off, for example as shown in FIG. 5A. However, in the conventional rectangular-pulse power supply 61, reaction speed of the switching element has a limitation. In the case of a power MOSFET, generally a time of hundreds of nanoseconds is required between turning the switching element on and off, and the voltage pulse of tens of nanoseconds cannot be formed. When the voltage pulse has a pulse duration more than hundreds of nanoseconds, as described above, the ionization of the working fluid is generated to provide the conduction, which worsens the surface state of the work. Therefore, it is necessary that ionization concentration is decreased by replenishing the working fluid, or it is necessary that the ionized working fluid is washed away by generating a flow of the working fluid to diffuse the ion and the working fluid is maintained at a non-ionized state between the tool electrode 51 and the work 53. In addition, it is necessary to perform work by temporarily stopping the rectangular-pulse power supply 61 to retract the tool electrode 51 upward. Consequently, as the number of conduction times is increased, the machining time becomes longer.

An object of the invention is therefore to provide an electrical discharge machining method and an electrical discharge machining apparatus in which the accuracy of machining and machining speed are improved.

Another object of the invention is to provide an electrical discharge machining method and an electrical discharge machining apparatus in which the ionization of the working fluid is suppressed to shorten the machining time by adjusting duty ratio of voltage applied to the tool electrode according to a generation state such as the electrical discharge the tool electrode and the work.

A further object of the invention is to provide an electrical discharge machining method and an electrical discharge machining apparatus, in which high accuracy machining of surface roughness can be provided by appropriately setting an applied voltage, a voltage pulse duration, and a number of applied times between the tool electrode and the work.

SUMMARY OF THE INVENTION

An electrical discharge machining apparatus according to the present invention includes: a work electrode adapted to support a work immersed in a working fluid; a tool electrode located opposing the work electrode with a predetermined gap; a capacitor that is connected between the work electrode and the tool electrode to provide a series of voltage pulses; a charging circuit having a power supply and a first switching element which are connected in series to the capacitor; a charge regulating circuit having a second switching element connected in series to the capacitor; and a control unit that controls the first and second switching elements, such that the first switching element turns on, and then the second switching element turns on before the first switching element turns off, whereby one voltage pulse, having a leading edge corresponding to the turning on of the first switching element and a trailing edge corresponding to the turning on of the second switching element, is generated.

According to the present invention, the electrical discharge machining apparatus includes the charging switching element for switching the charging circuit that charges the capacitor and the charge regulating switching element for switching the charge regulating circuit. Switching each of the two switching elements can utilize a short rise time of the switching element to generate the voltage pulse whose pulse duration is very narrow. Therefore, because an applying time of the voltage pulse to the tool electrode can be shortened, ionization of the working fluid can be suppressed and machining efficiency can be improved.

In the electrical discharge machining apparatus according to the present invention, a state between the tool electrode and the work is determined, and a duty ratio of a voltage pulse to be applied is controlled depending on the determined state. Therefore, the duty ratio of the voltage pulse can appropriately be set on the basis of the state such as an electrical discharging state, abnormal electrical discharging state, ion conducting state, and short circuiting state to suppress the ionization of the working fluid, and the machining efficiency can be improved.

According to the present invention, pulse duration and frequency (duty ratio) and voltage of the voltage pulse applied between the tool electrode and the work are appropriately controlled, such that the surface roughness of the work can also be highly accurate.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 6A is a timing chart of the potential of the charging FET;

FIG. 6B is a timing chart of the potential of the charge regulating FET;

FIG. 6C is a timing chart of the voltage pulse generated by switching of the charging FET and the charge regulating FET of the electrical discharge machining apparatus according to the first embodiment of the invention;

FIG. 7 is a timing chart in which the two switching elements are switched when a voltage pulse interval is changed in the electrical discharge machining apparatus according to the first embodiment of the invention;

FIG. 12 is a flowchart of an electrical discharge machining method according to the second embodiment of the invention;

FIG. 13A shows a short circuit state between the tool electrode and the work;

FIG. 13B shows an abnormal electrical discharge state between the tool electrode and the work;

FIG. 13C shows an electrical discharge state between the tool electrode and the work;

FIG. 13D shows a conduction state between the tool electrode and the work;

FIG. 13E shows a nothing happening state (no conduction state) in which nothing happens between the tool electrode and the work;

DETAILED DESCRIPTION OF THE PREFERRED EMBODIMENTS

Figure 1:
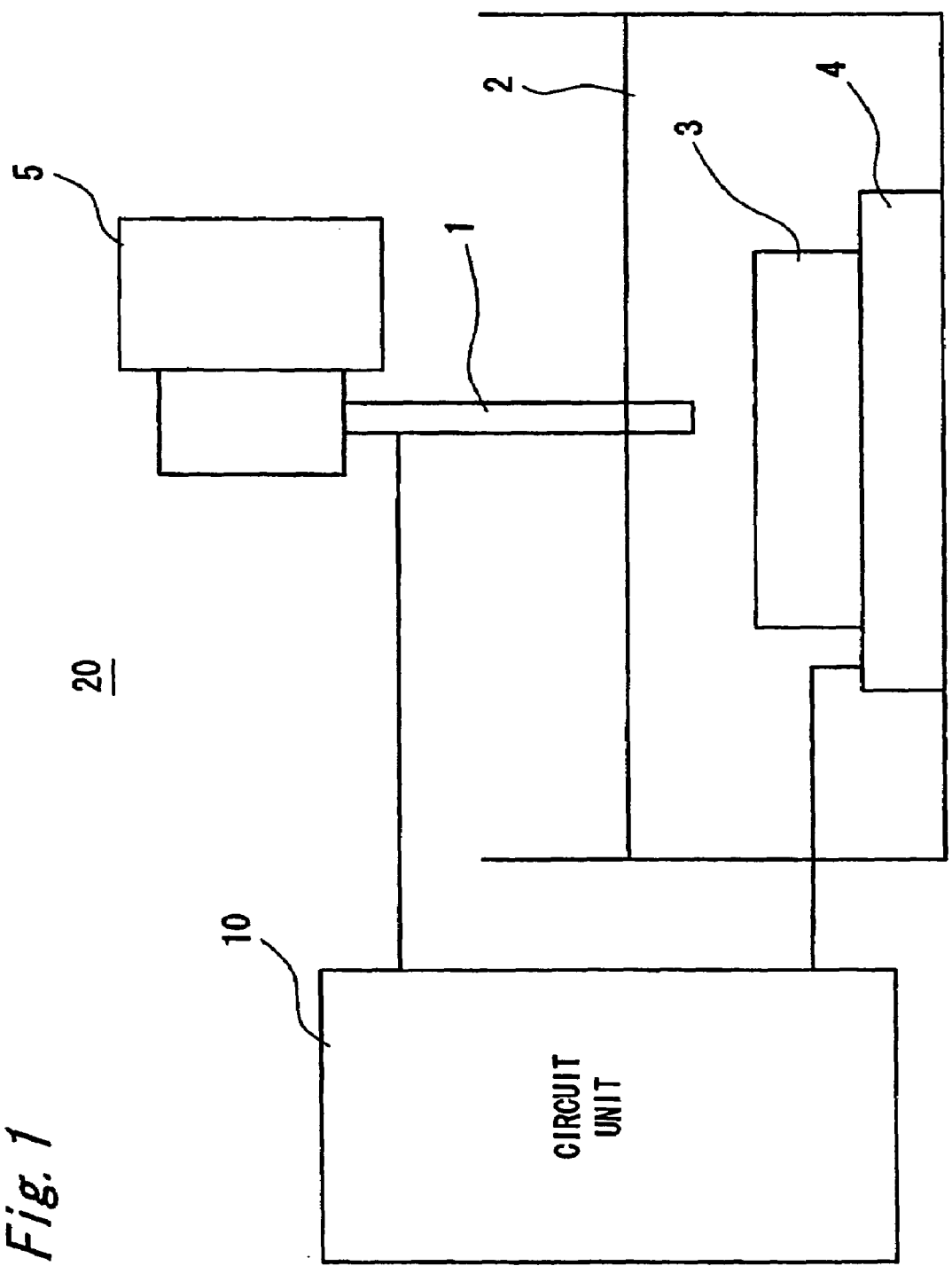
FIG. 1 is a schematic view showing a configuration of an electrical discharge machining apparatus according to a first embodiment of the invention.

Referring to the accompanying drawings, a forming apparatus according to preferred embodiments of the invention, particularly an electrical discharge machining apparatus and an electrochemical machining apparatus will be described below. In the drawings, the substantially same constituent component is represented by the same reference numeral.

First Embodiment

FIG. 1 shows a schematic configuration of an electrical discharge machining apparatus 20 according to a first embodiment of the invention. The electrical discharge machining apparatus 20 includes a tool electrode 1, a drive unit 5 that vertically moves the tool electrode 1, a work (work piece) electrode 4 that supports a work 3 made of metal and the like immersed in a working fluid 2, and a circuit unit 10 that is electrically connected to the tool electrode 1 and the work electrode 4. The work 3 is placed and fixed onto the work electrode 4. The tool electrode 1 is located opposing the work electrode 4 with a predetermined gap therebetween. The work 3 and at least a leading end portion of the tool electrode 1 are immersed in the working fluid 2 such as deionized water having relatively high insulating characteristics. Then, the gap between the tool electrode 1 and the work 3 is filled with the working fluid 2. When a potential difference or a distance between the tool electrode 1 and the work 3 does not satisfy electrical discharge generating conditions, the insulating characteristics of the working fluid 2 provide insulation between the tool electrode 1 and the work 3.

A circuit configuration of the electrical discharge machining apparatus 20 will now be described with reference to FIG. 2. The circuit unit 10 includes a capacitor 18 that is connected between the tool electrode 1 and the work 3, a charging circuit C1 that charges the capacitor 18, and a charge regulating circuit C2 that regulates a charge amount of the capacitor 18. The capacitor 18 is adapted to provide a series of voltage pulses between the tool electrode 1 and the work 3. The charging circuit C1 is one that is shown by an alternate long and short dashed line in FIG. 2, and the charging circuit C1 includes a DC power supply 11, a charging switching element 14 that switches the charging circuit C1, resistors R1 and R3, and the capacitor 18. The charge regulating circuit C2 is one that is shown by a dotted line in FIG. 2, and the charge regulating circuit C2 includes a charge regulating switching element 13 that switches the charge regulating circuit C2, the charging switching element 14, the resistor R3, and the capacitor 18. It is noted that the charge regulating circuit C2 may include at least the charge regulating switching element 13 connected in series to the capacitor 18. The two switching elements 13 and 14 are each an FET element. The circuit unit 10 also includes a control circuit 12 that controls the two switching elements 13 and 14, and the circuit unit 10 can control a switching timing of each of the switching elements 13 and 14 to control a duty ratio of a generated voltage pulse. It is noted that controlling the duty ratio corresponds to controlling at least one of the pulse duration and frequency.

Figure 3:
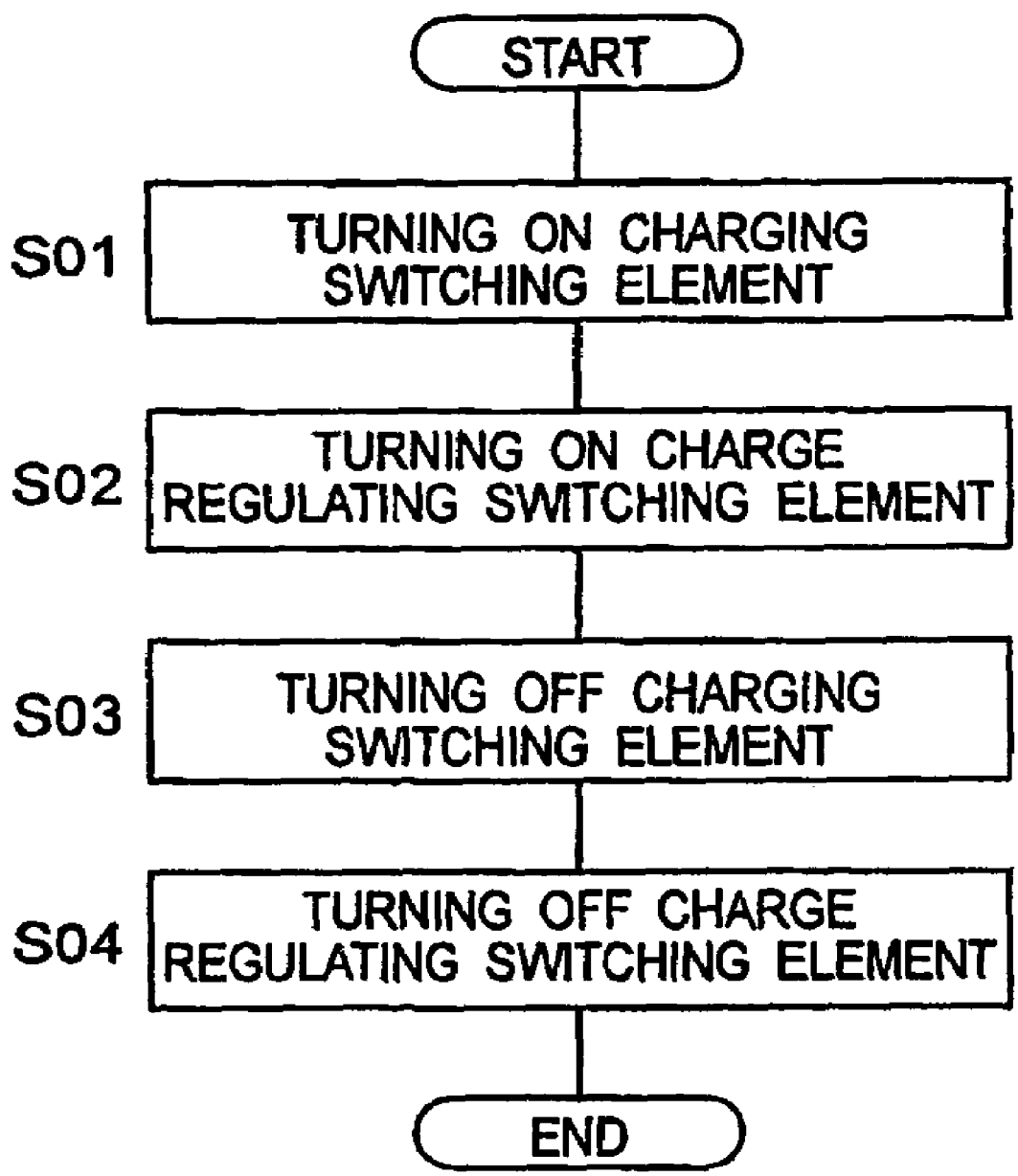
FIG. 3 is a flowchart of an electrical discharge machining method according to the first embodiment of the invention.

Referring to a flowchart of FIG. 3, a method of performing the electrical discharge machining with the electrical discharge machining apparatus 20 will be described.

a) The charging switching element 14 is turned on to charge the capacitor 18 by the voltage provided from the DC power supply 11 in the charging circuit C2 (S01).

b) Then, the drive unit 5 brings the tool electrode 1 close to the work 3 to discharge the electric charge that is charged in the capacitor 18, and discharge current is passed to perform the electrical discharge machining to the work 3.

c) After a predetermined time elapses, the charge regulating switching element 13 is turned on before the charging switching element turns off to regulate the charge amount of the capacitor 18 by the charge regulating circuit C2 (S02). Therefore, one voltage pulse, having a leading edge corresponding to the turning on of the charging switching element 14 and a trailing edge corresponding to the turning on of the charge regulating switching element 13, can be generated between the tool electrode 1 and the work 3. Then, the electrical discharge is stopped.

d) The charging switching element 14 is turned off (S03).

e) The charge regulating switching element 13 is turned off (S04).

The voltage between electrodes of the capacitor 18 is equal to the voltage between the tool electrode 1 and the work electrode 4. When the work 3 is made of metal, the voltage between electrodes of the capacitor 18 is also substantially equal to the voltage between the tool electrode 1 and the work 3.

Figure 4:
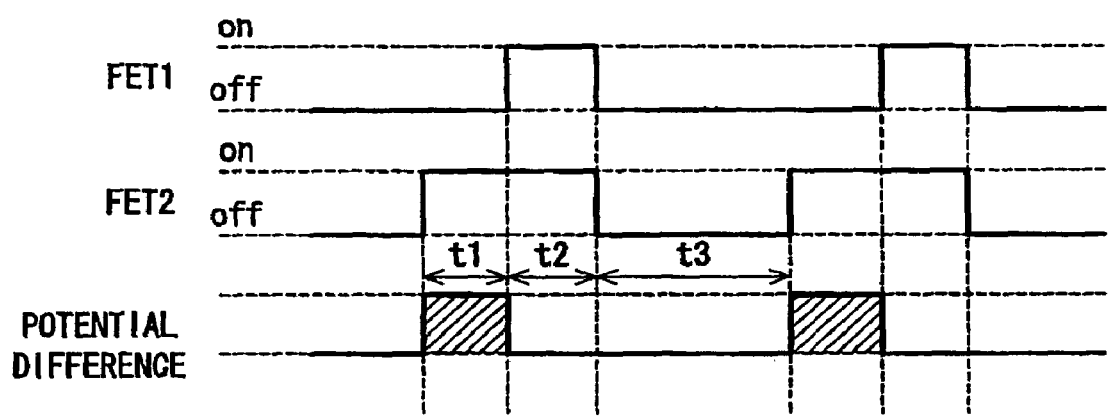
FIG. 4 is a timing chart in which a charging switching element and an charge regulating switching element are switched in the electrical discharge machining apparatus according to the first embodiment of the invention.

FIG. 4 is a switching timing chart of the charging switching element (FET2) 14 and the charge regulating switching element (FET1) 13.

a) When both the charge regulating switching element (FET1) 13 and the charging switching element (FET2) 14 are in an off state, since the capacitor 18 is not charged, the voltage is not applied between the tool electrode 1 and the work electrode 4.

b) When only the charging switching element (FET2) 14 is turned on, the charging circuit C1 is connected to charge the capacitor 18, and the voltage is provided between the tool electrode 1 and the work electrode 4 by the DC power supply 11. At this point, a distance from the tool electrode 1 to the work electrode 4 is brought close, which generates the electrical discharge between the tool electrode 1 and the work electrode 4 to machine the work 3.

c) After the charging switching element (FET2) 14 is turned on, the charge regulating switching element (FET1) 13 is turned on after a predetermined time t1 has elapsed, which allows the charge regulating circuit C2 to be connected to regulate the charge amount of the capacitor 18. Therefore, the electrical discharge is stopped. The time t1 from the turning-on of the charging switching element (FET2) 14 to the turning-on of the charge regulating switching element (FET1) 13 becomes the duration of the voltage pulse applied to the capacitor 18.

d) Then, both the charging switching element (FET2) 14 and the charge regulating switching element (FET1) 13 are turned off. It is possible that the two switching elements are turned off at the same timing.

In the case where the electrical discharge is not generated and the electrical discharge machining is not performed, the charge regulating switching element (FET1) 13 is turned on, thereby the voltage is not applied between the tool electrode 1 and the work electrode 4, and the electric charge charged in the capacitor 18 is discharged at the same time. Therefore, the working fluid can be prevented from ionizing.

Figure 5A:
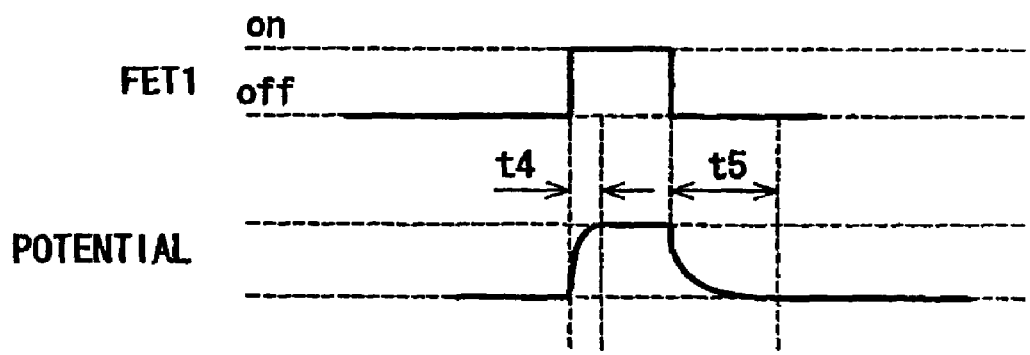
FIG. 5A shows a voltage pulse generated by turning one switching element on and off.
Figure 5B:
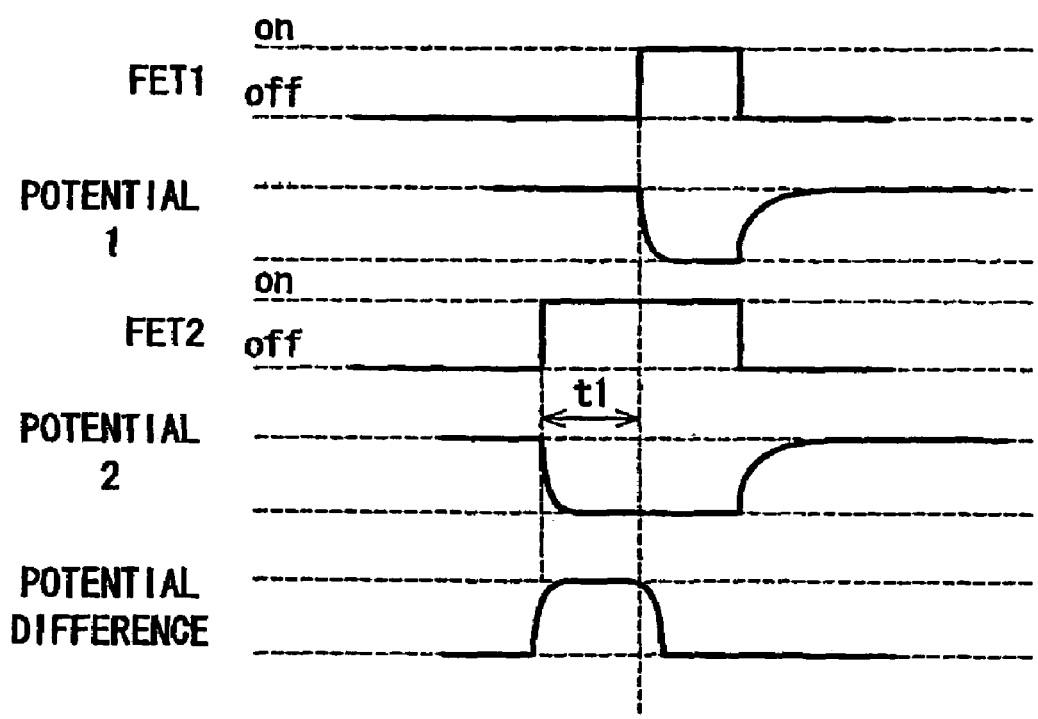
FIG. 5B shows the voltage pulse generated by switching of two switching elements of the electrical discharge machining apparatus according to the first embodiment of the invention.

FIGS. 5A and 5B are views for explaining the effect in the electrical discharge machining apparatus 20 according to the first embodiment of the invention. Specifically, the circuit unit 10 of the electrical discharge machining apparatus 20 can generate the voltage pulse having the duration of tens of nanoseconds. FIG. 5A is an example of the timing chart in which a rectangular pulse is generated by the switching of the one switching element in the conventional art. When the rectangular pulse is generated by using one switching element, as shown in FIG. 5A, although a rise time t4 is relatively narrow in turning on the switching element, a fall time t5 is relatively long in turning off the switching element. This phenomenon depends on the material and configuration of the switching element. Generally, real response speed is delayed with respect to on and off signals. A time t4 from the off state to the on state is at most about tens of nanoseconds, and a time t5 from the on state to the off state is about hundreds of nanoseconds. Therefore, the duration more than hundreds of nanoseconds is required for the on and off control performed by the one switching element in the conventional art.

On the other hand, FIG. 5B is an example of the timing chart in which the rectangular pulse is generated by the two switching elements 13 and 14 in the electrical discharge machining apparatus 20 according to the first embodiment. In the electrical discharge machining apparatus 20, the charging circuit C1 and the charge regulating circuit C2 are formed, and the switching elements 14 and 13 are provided in each of the charging circuit C1 and the charge regulating circuit C2, which allows the time duration between the rise time of the charging switching element 14 and the rise time of the charge regulating switching element 13 to be set to the time duration t1 of the voltage pulse. Namely, in the switching element, the faster operation time of the time t4 from the off state to the on state is used and the switching element is individually operated. This allows the voltage pulse having the time duration t1 of tens of nanoseconds to be obtained at peak voltages of more than about 70V. As shown in FIG. 6, the voltage pulse that has a predetermined pulse duration and interval can be generated by the on and off control of the charging switching element 14 and the charge regulating switching element 13.

FIG. 7 shows two examples in which an interval t6 is changed while the resulting voltage pulse duration is maintained at a constant value. In FIG. 7, the voltage pulse on the right side differs from the voltage pulse on the left side in that the interval t6 is broad. The switching interval t6 that turns on the charge regulating switching element 13 becomes the interval t6 of the voltage pulse. The interval in which the discharge current is passed can be changed by changing the interval t6. When the capacitance of the capacitor is small, the number of machining times is increased by thickening the voltage intervals to increase the number of electrical discharge times. Therefore, the amount of machining can be increased and the machining speed can be increased.

Figure 2:
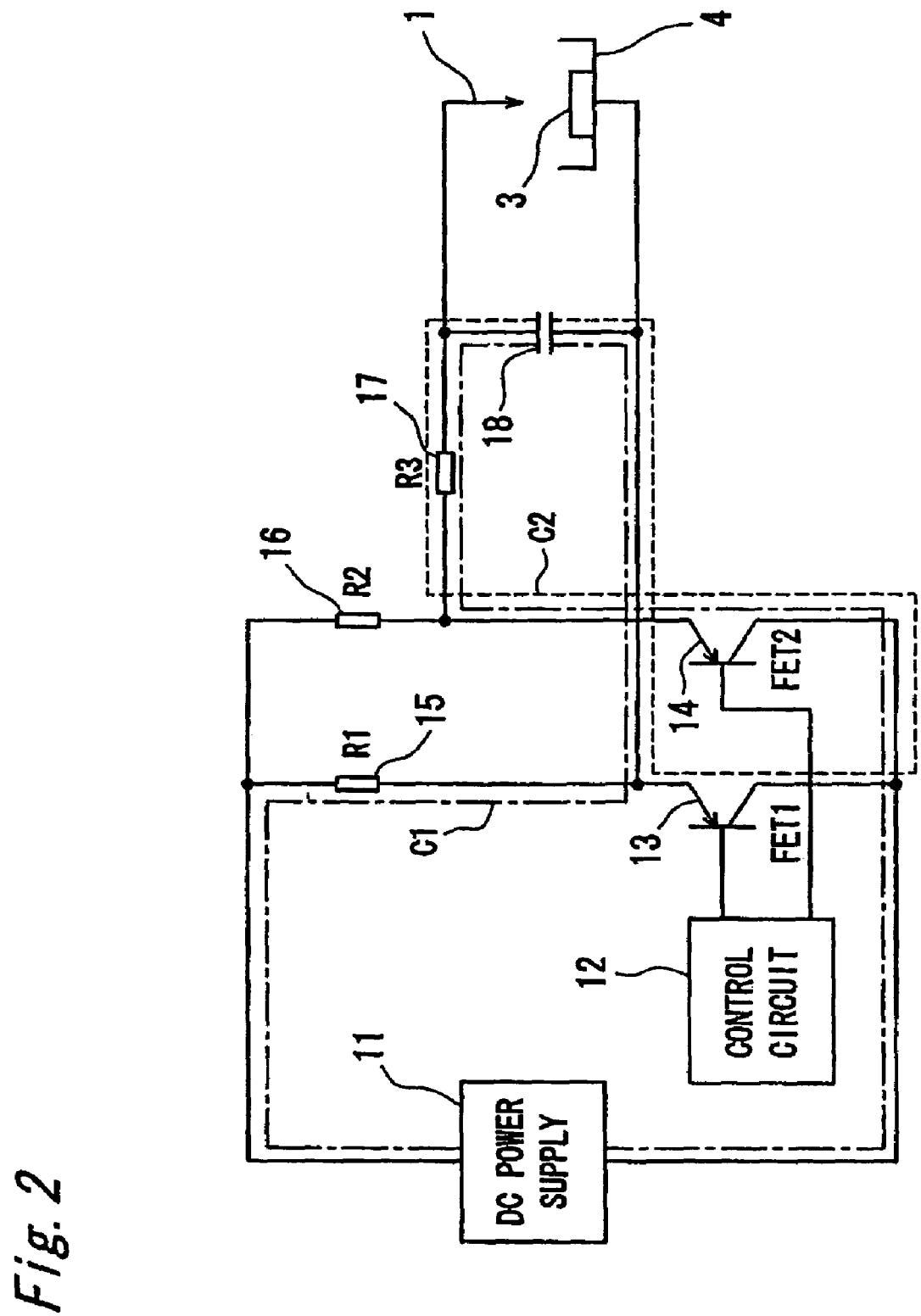
FIG. 2 shows a detail circuit configuration of a circuit unit of FIG. 1.
Figure 8:
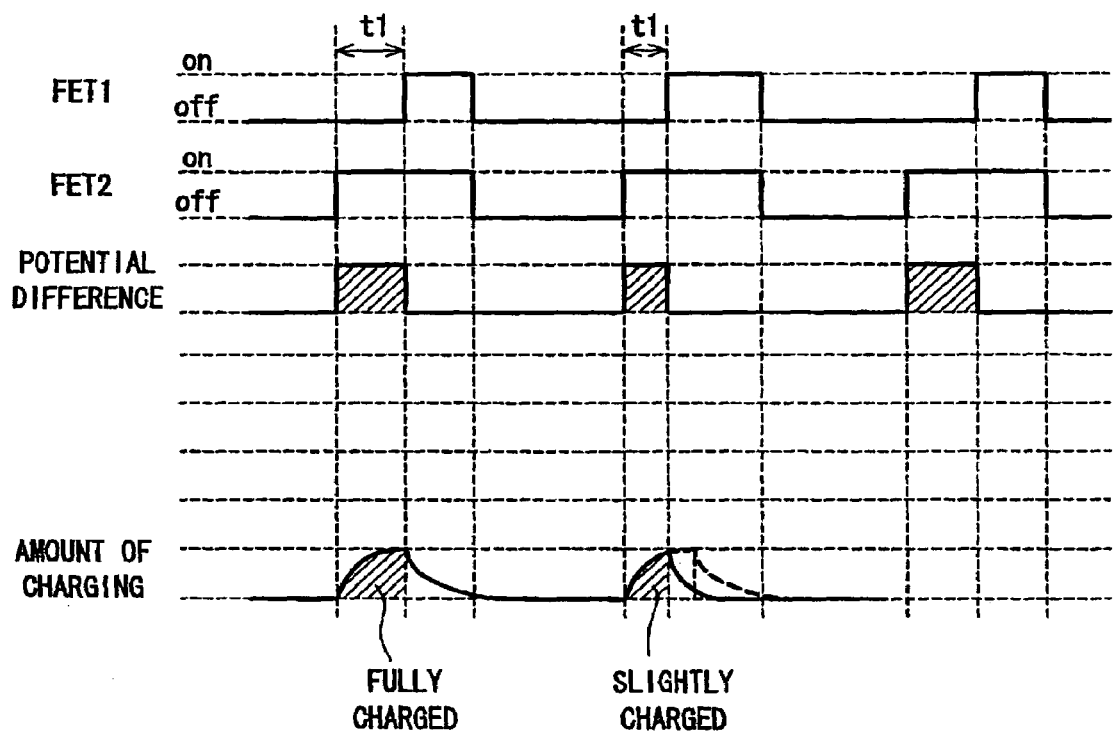
FIG. 8 is a timing chart in which the two switching elements are switched when the amount of capacitance of a capacitor is changed by changing a voltage pulse duration in the electrical discharge machining apparatus according to the first embodiment of the invention.

FIG. 8 is a timing chart showing the on and off control of the charge regulating switching element (FET1) 13 and the charging switching element (FET2) 14 in the circuit configuration of FIG. 2. As shown in FIG. 8, the amount of capacitance that is charged in the capacitor 18 depends on a length of the time duration t1 of the voltage pulse. Namely, changing the time duration t1 changes the charging time to the capacitor 18, which allows the amount of capacitance of the capacitor 18 to be changed. Conventionally, since the amount of capacitance is determined by the capacitance of the capacitor, only the capacitor having the different capacitance is used in order to change the amount of capacitance. However, in the electrical discharge machining apparatus 20, the amount of capacitance can be controlled by changing the time duration t1.

Figure 9A:
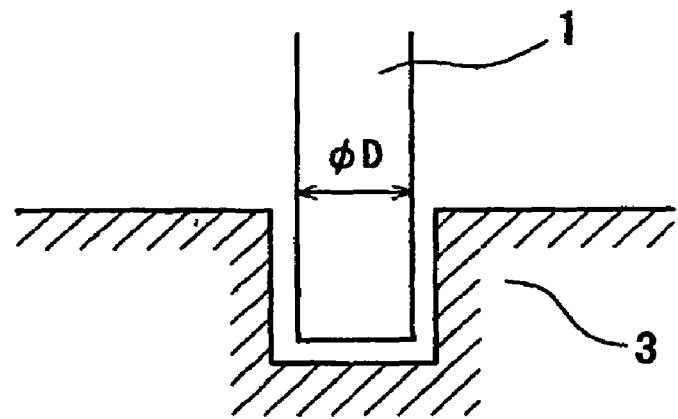
FIG. 9A is a schematic view in the case where one pore is made in a work with a tool electrode.
Figure 9B:
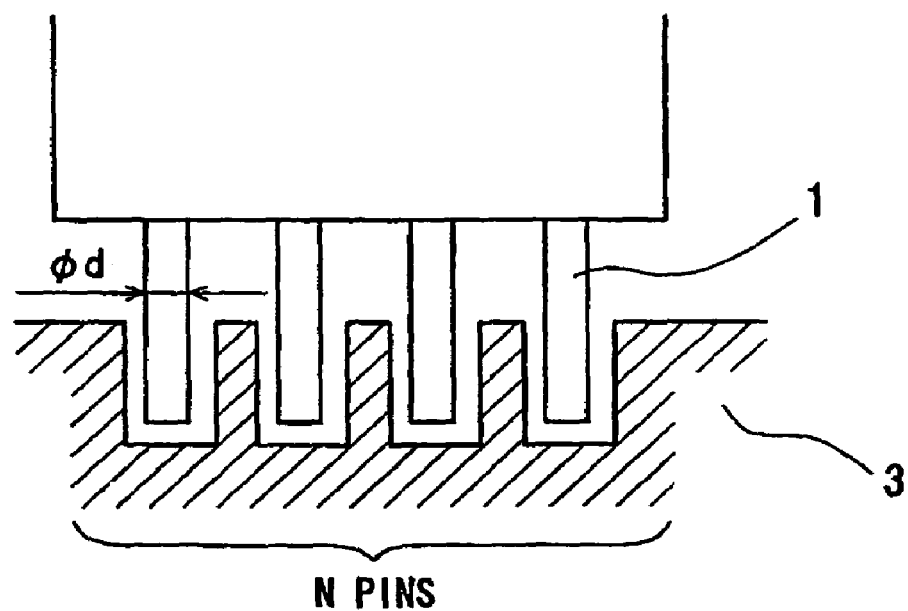
FIG. 9B is a schematic view in the case where a plurality of pores are simultaneously made in the work with the tool electrode having a plurality of pins.

FIG. 9A is a schematic view in the case where one pore having a diameter D is made in the work 3 with the tool electrode 1, and FIG. 9B is a schematic view in the case where many microscopic pores having diameters d not more than tens of micrometers are made in the work 3 with the plurality of tool electrodes 1. When the one pore is made in the work 3, as shown in FIG. 9A, it is possible to use the one tool electrode 1. On the other hand, when the plurality of pores are made in the work 3, as shown in FIG. 9B, it is possible to use the one tool electrode 1 having a plurality of pins. In the case where deionized water is used as the working fluid 2 existing between the tool electrode 1 and the work 3, and in the case where only the voltage pulse having the long time duration more than hundreds of nanoseconds is applied like the conventional art, unless the machining is performed while the flow of the working fluid is generated, there is the problem in that the ionization of the working fluid progresses to decrease the accuracy of machining. However, in the electrical discharge machining apparatus according to the first embodiment of the invention, since the voltage pulse having the short time duration of tens of nanoseconds can be applied, as shown in FIG. 9B, many microscopic pores can simultaneously be made by using the tool electrode 1 in which the electrode including many microscopic cylindrical or prism pins is arranged. In this case, water can be used as the working fluid 2, and it is not necessary to generate the flow of the working fluid.

Second Embodiment

Figure 10:
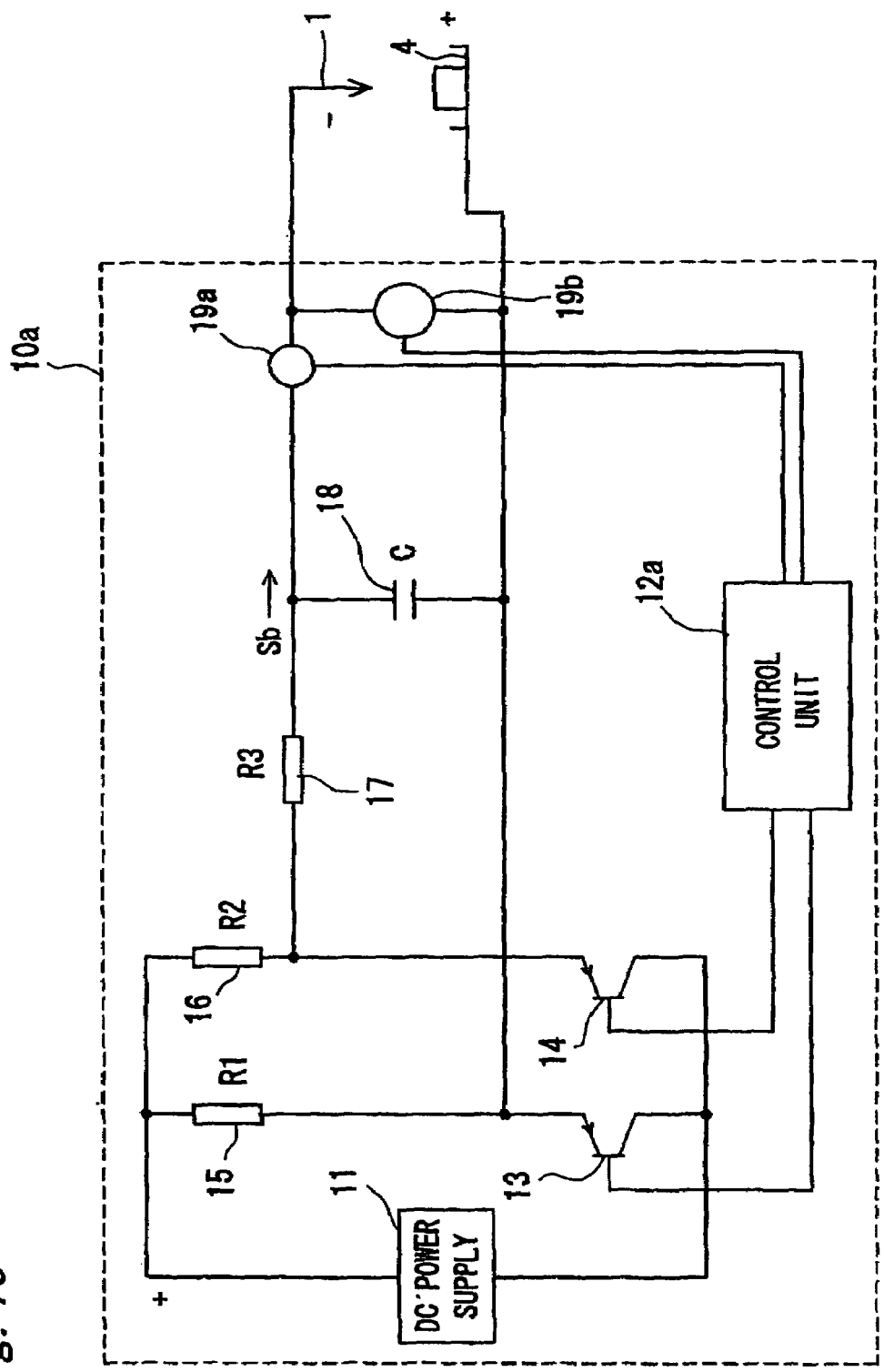
FIG. 10 shows a circuit configuration of an electrical discharge machining apparatus according to a second embodiment of the invention.

FIG. 10 is a schematic view showing a circuit configuration of an electrical discharge machining apparatus according to a second embodiment of the invention. As shown in FIG. 10, the electrical discharge machining apparatus according to the second embodiment differs from the electrical discharge machining apparatus according to the first embodiment in the configuration of a circuit unit 10a. The circuit unit 10a differs in that the circuit unit 10a includes a current detector 19a that detects the current passing between the tool electrode 1 and the work electrode 4, and a voltage detector 19b that detects the voltage applied between the tool electrode 1 and the work electrode 4. The current detector 19a and the voltage detector 19b are connected to a control unit 12a, and measured voltage data and current data are inputted to the control unit 12a. The capacitor 18 is charged by applying the voltage outputted from the direct-current power supply 11 (DC power supply) constituting the charging circuit through the resistors 15 and 17. The charging and charge regulating of the capacitor 18 are performed by switching the charging switching element 14 and the charge regulating switching element 13 such as FETs. The term of switching means turning the switching elements 13 and 14 on and off. For example, when the charging switching element 14 is turned on, the charging circuit connected to the charging switching element 14 can be electrically connected. When the charging switching element 14 is turned off, the charging circuit connected to the charging switching element 14 can be electrically cut.

On the other hand, when the charge regulating switching element 13 is turned on, the charge regulating circuit can be electrically connected. Since the charge and electrical discharge of the capacitor 18 are described in detail in the first embodiment, the description thereof is omitted.

FIG. 12 is a flowchart of the electrical discharge machining method according to the second embodiment of the invention.

a) The voltage pulse having the predetermined pulse duration and interval is applied between the tool electrode 1 and the work electrode 4 (S11).

b) At least one of the voltage and current between the tool electrode 1 and the work electrode 4 is measured in the circuit (S12). In the circuit of FIG. 10, the current is measured with the current detector 19a and the voltage is measured with the voltage detector 19b.

c) A state between the tool electrode 1 and the work 3 is determined on the basis of the measurement result (S13).

d) A duty ratio of the voltage pulse is controlled depending on the determined state (S14). The steps S13 and S14 will be described in detail later.

Therefore, the appropriate voltage pulse can be applied depending on the state between the tool electrode 1 and the work 3, and the machining efficiency can be improved. For example, when the conduction is provided, the interval of the voltage pulse can be broadened to suppress the ionization of the working fluid 2. When the electrical discharge is continuously generated, the interval of the voltage pulse can be narrowed to efficiently generate the electrical discharge.

FIGS. 13A to 13E are schematic views for explaining the state between the tool electrode 1 and the work 3. FIG. 13A shows the state in which the tool electrode 1 is in contact with the work 3, i.e. the state of "short circuit". FIG. 13B shows an example in which the tool electrode 1 and the work 3 are in the state of "abnormal electrical discharge". The abnormal electrical discharge is where the electrical discharge is smaller than the normal electrical discharge, which is caused by a partially too close distance between the tool electrode 1 and the work 3. For example, sometimes the small electrical discharge is generated between the tool electrode 1 and machining debris 7 generated in forming a pore 6, and this is the abnormal electrical discharge. The small electrical discharge generated in this case is smaller than the normal electrical discharge that is suitable to the machining of the work 3. FIG. 13C shows the state in which "electrical discharge" is generated between the tool electrode 1 and the work 3. The electrical discharge machining of the work 3 is performed by the electrical discharge. FIG. 13D shows an example of the state of "conduction" in which conduction current 8 is passed between the tool electrode 1 and the work 3 through the ionized working fluid. FIG. 13E shows the state in which nothing happens because the tool electrode 1 is separated far away from the work 3. When the abnormal electrical discharge or the conduction is generated, the surface of the work 3 is heated and melted. However, because the abnormal electrical discharge or the conduction does not have as much as energy that can remove the melted portion, the melted portion is solidified again to generate depressions and projections in the surface of the work 3. When the portion formed in the projected shape exists in the surface of the work 3, because the distance between the tool electrode 1 and the work 3 is shortened, there is a fear that the abnormal electrical discharge or the conduction is further induced. Further, because the accuracy of machining is decreased, it is not preferable that the depressions and projections are generated in the surface of the work 3.

Figure 11:
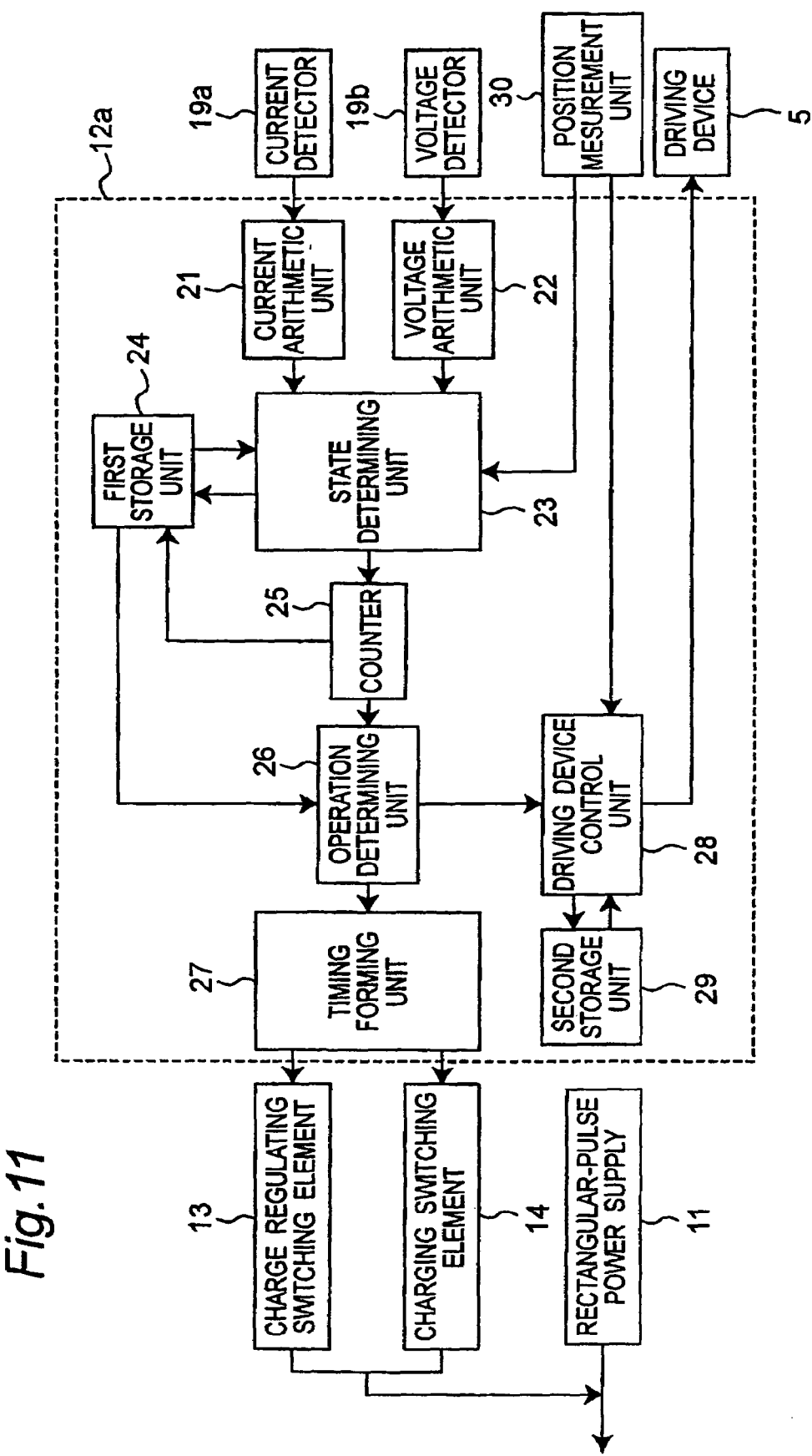
FIG. 11 is a block diagram showing a detail configuration of a control unit of FIG. 10.

FIG. 11 is a block diagram showing the detail configuration of the control unit 12a of FIG. 10. As shown in FIG. 11, the current data and voltage data measured by the current detector 19a and the voltage detector 19b are inputted to a current arithmetic unit 21 and a voltage arithmetic unit 22, respectively, to perform signal processing, and then the measured current data and voltage data are inputted to a state determining unit 23. The state determining unit 23 compares the measured current data and voltage data to data (threshold and the like) stored in a first storage unit 24 to determine that the state between the tool electrode 1 and the work 3 is any one of the electrical discharge, the conduction the abnormal electrical discharge, the short circuit, and the nothing happened (no conduction state) states.

Figure 16A:
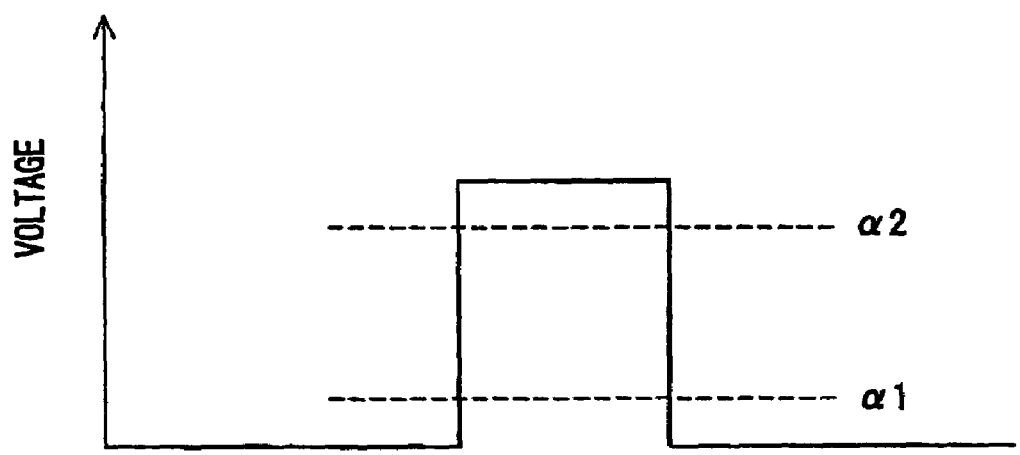
FIG. 16A is a view for explaining an example of a method of determining the electrical discharge or the conduction by a measured voltage.
Figure 16B:
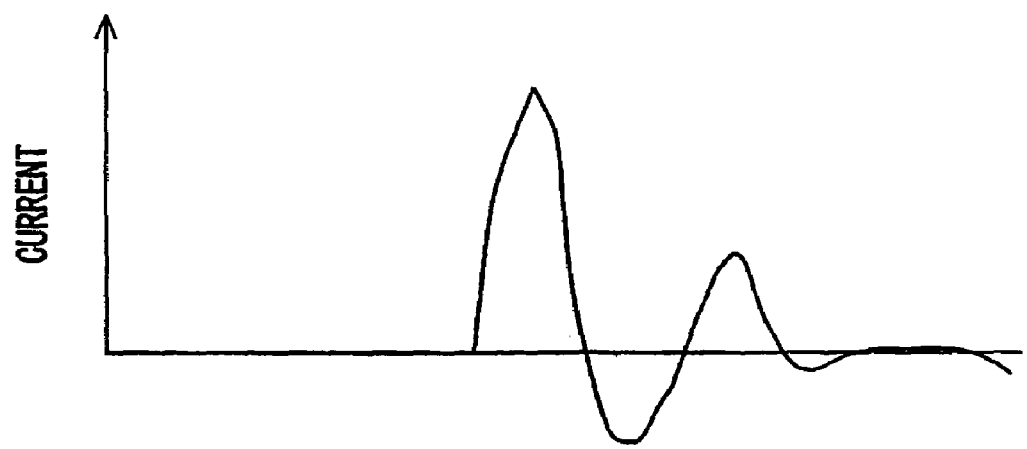
FIG. 16B is a view for explaining an example of the method of determining the electrical discharge or the conduction by the measured voltage.

FIGS. 16A and 16B are schematic views for explaining an example in determining the state between the tool electrode 1 and the work 3 from the measured current data and voltage data. For example, the state determining unit 23 compares the measured voltage data outputted from the voltage arithmetic unit 22 to the threshold data stored in the first storage unit 24. As shown in FIG. 16A, the state determining unit 23 determines that the state between the tool electrode 1 and the work 3 is the short circuit state when the measured voltage is lower than a threshold $\alpha 1$, the state determining unit 23 determines that the abnormal electrical discharge is generated when the measured voltage is not lower than the threshold $\alpha 1$ and lower than a threshold $\alpha 2$, the state determining unit 23 determines that the short circuit is generated when the measured voltage is lower than a threshold $\alpha 1$, and the state determining unit 23 determines that the electrical discharge is generated when the measured voltage is not lower than the threshold $\alpha 2$. The state determining unit 23 compares the measured current data outputted from the current arithmetic unit 21 to the threshold data stored in the first storage unit 24, and the state determining unit 23 can determine that the electrical discharge is generated when the electrical discharge current shown in FIG. 16B is detected. The state determining unit 23 can determine the conduction from the facts that the minute electric current is passed and the voltage is gently decreased.

It is possible that the thresholds $\alpha 1$ and $\alpha 2$ are set to constant values but are changed according to a depth (machining depth d) of the pore made in the work 3. For example, as shown in the following Table 1, assuming that the surface of the work 3 is set to machining depth d=0 μm before the machining, the threshold $\alpha 1$ for determining the short circuit is set to 10V when the machining depth d ranges from 0 μm to 50 μm, the threshold $\alpha 1$ is set to 15V when the machining depth d ranges from 51 μm to 100 μm, the threshold $\alpha 1$ is set to 30V when the machining depth d ranges from 101 μm to 150 μm, the threshold $\alpha 1$ is set to 45V when the machining depth d ranges from 151 μm to 200 μm, and the threshold $\alpha 1$ is set to 60V when the machining depth d is not lower than 201 μm.

TABLE 1

| | Machining depth d (μm) | | | | |
| --- | --- | --- | --- | --- | --- |
| | 0 to 50 | 51 to 100 | 101 to 150 | 151 to 200 | 201 |
| Threshold for determining short circuit a1 (V) | 10 | 15 | 30 | 45 | 60 |

When the threshold $\alpha 1$ for determining the short circuit is changed according to the machining depth d, the state determining unit 23 fetches the threshold $\alpha 1$ from the first storage unit 24 on the basis of information on the machining depth obtained from a position measurement unit 30, and the state determining unit 23 compares the value inputted from the voltage arithmetic unit 22 or the current arithmetic unit 21 to the threshold α1 to determine whether or not the short circuit exists. It is possible that the position measurement unit 30 constitutes a means for computing the depth of the pore made in the work 3 from, e.g. a moving distance, a moving time of the tool electrode 1 and others. Further, the position measurement unit 30 is not limited to the above means, and it is possible for the position measurement unit 30 to constitute a means for measuring or estimating the machining depth by a method other than the above method.

Figure 14:
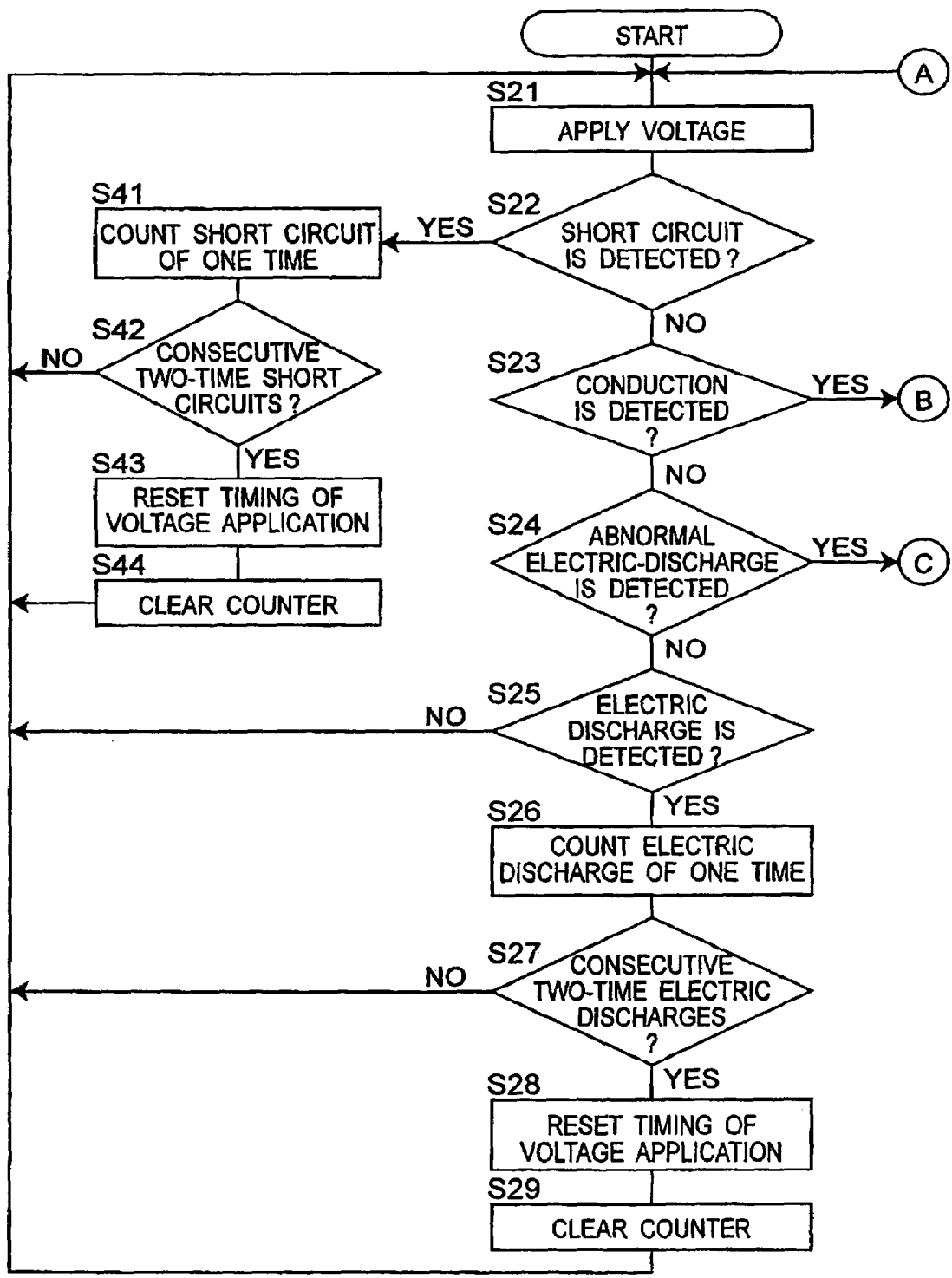
FIG. 14 is a flowchart for explaining the electrical discharge machining method according to the second embodiment of the invention.
Figure 15:
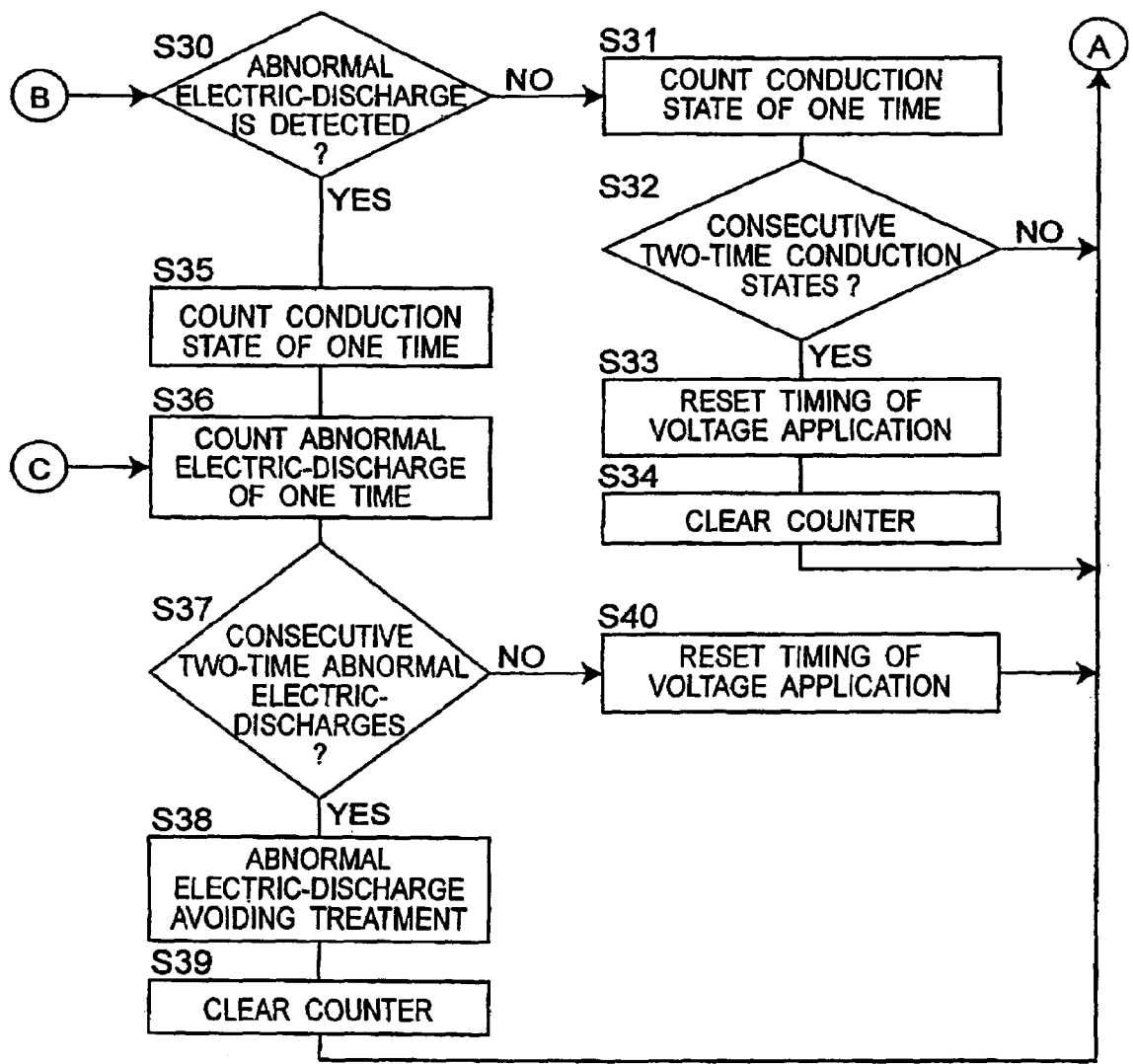
FIG. 15 is a flowchart that follows FIG. 14.

Referring to FIGS. 11, 14, and 15, the electrical discharge machining method according to the second embodiment of the invention will be described in detail.

a) The voltage pulse having the predetermined pulse duration and interval is applied between the tool electrode 1 and the work electrode 4 (S21). The current is detected between the tool electrode 1 and the work electrode 4 with the current detector 19a, and the voltage is detected between the tool electrode 1 and the work electrode 4 with the voltage detector 19b.

b) On the basis of the detected current data and voltage data, the state determining unit 23 determines that the state between the tool electrode 1 and the work 3 is any one of the short circuit (contact), the conduction, the abnormal electrical discharge, and the electrical discharge states (S22, S23, S24, S25, and S30). In this case, the determination of whether the state is the short circuit, the determination of whether the state is the short circuit (S22), the determination of whether the state is the conduction (S23), the determination of whether the state is the abnormal electrical discharge (S24 and S30), and the determination of whether the state is the electrical discharge (S25) are sequentially performed. However, it is also possible that the determination of the state may be performed once and the process may be divided into each of the states.

Each of the states will be individually described below.

Electrical Discharge c) The case in which the short circuit (contact), the conduction, and the abnormal electrical discharge are not detected (S22 to S24) but only the electrical discharge is detected (S25) will be described. In this case, a counter 25 counts the electrical discharge of one time (S26). The result of the count is outputted to the first storage unit 24 and an operation determining unit 26.

d) The operation determining unit 26 fetches the count result stored in the first storage unit 24 to determine whether or not the electrical discharge counted at this time is the consecutive second-time electrical discharge (S27). The consecutive second-time electrical discharge means that the electrical discharges are consecutively detected for two consecutive voltage pulses applied between the tool electrode 1 and the work electrode 4. When the electrical discharge is not the consecutive second-time electrical discharge, the duty ratio of the voltage pulse is not changed and the flow is returned to the application of the voltage pulse (to S21).

e) When the two consecutive electrical discharges are detected, the operation determining unit 26 issues a command to shorten the interval of the voltage pulse applied between the tool electrode 1 and the work electrode 4 to a timing forming unit 27 (S28). The timing forming unit 27 controls the switching of the switching elements 13 and 14 on the basis of the command signal to apply the voltage pulse in which the interval is narrowed. This allows the machining efficiency to be improved.

f) Then, the count stored in the first storage unit 24 is erased (S29). The operation determining unit 26 or the timing forming unit 27 includes an internal reference clock that can determine the timing of the switching.

Nothing Happening State (No Conduction State)

g) When the state determining unit 23 does not detect the short circuit, the conduction, the abnormal electrical discharge, and the electrical discharge (S22 to S25), the timing of the switching of the switching elements 13 and 14 is not changed (from S25 to S21). The state in which the short circuit, the conduction, the abnormal electrical discharge, and the electrical discharge are not detected means the state in which nothing happens because the tool electrode 1 is separated far away from the work 3 as shown in FIG. 13E. In this case, the high voltage is continuously applied between the tool electrode 1 and the work 3 until the charge regulating switching element 13 is turned on from when the charging switching element 14 is turned on, so that there is a high possibility that the working fluid 2 is ionized. When the working fluid 2 is ionized, it is expected that the conduction is detected.

Conduction State h) When the state determining unit 23 determines that the conduction is generated (S23) and the state determining unit 23 does not determine that the abnormal electrical discharge is generated (S30), the counter 25 counts the conduction of one time (S31). The count result is outputted to the first storage unit 24 and the operation determining unit 26.

i) The operation determining unit 26 fetches the count result stored in the first storage unit 24 to determine whether or not the conduction counted at this time is the consecutive second-time conduction (S32). When the conduction is not the consecutive second-time conduction, the duty ratio of the voltage pulse is not changed and the flow is returned to the application of the voltage pulse (to S21).

j) When the consecutive second-time conduction is detected, the operation determining unit 26 issues the command to lengthen the interval of the voltage pulse applied between the tool electrode 1 and the work electrode 4, i.e. the command to reduce the duty ratio to the timing forming unit 27 (S33). The timing forming unit 27 controls the timing of the switching elements 13 and 14 on the basis of the command signal to reduce the duty ratio of the voltage pulse applied between the tool electrode 1 and the work electrode 4. There are two methods of reducing the duty ratio, i.e. the method of lengthening the interval of the voltage pulse while the pulse duration of the voltage pulse is not changed and the method of shortening the pulse duration of the voltage pulse while the interval of the voltage pulse is not changed. It is possible that the operation determining unit 26 determines which method is used in order to reduce the duty ratio.

k) Then, the counter 25 is cleared (S34).

Conduction State and Abnormal Electrical Discharge l) Sometimes both the conduction and the abnormal electrical discharge are detected for a one-time application of the voltage pulse between the tool electrode 1 and the work electrode 4 (S23 and S30). When the conduction is generated in applying the voltage between the tool electrode 1 and the work electrode 4, the voltage falls down, and the abnormal electrical discharge is generated while the conduction is generated. In this case, the counter 25 counts the conduction of one time and the abnormal electrical discharge of one time (S35 and S36). The count result is outputted to the first storage unit 24 and the operation determining unit 26.

m) The operation determining unit 26 fetches the count result stored in the first storage unit 24 to determine whether or not the abnormal electrical discharge is the consecutive second-time abnormal electrical discharge (S37). When the abnormal electrical discharge is not the consecutive second-time abnormal electrical discharge, the timing of the voltage pulse is reset (S40). Then, the flow is returned to the application of the voltage pulse (to S21).

n) When the operation determining unit 26 determines that the abnormal electrical discharge is the consecutive second-time abnormal electrical discharge, the operation determining unit 26 outputs an abnormal electrical discharge avoiding signal to the timing forming unit 27 and a driving device control unit 28 (S38). The timing forming unit 27 that receives the abnormal electrical discharge avoiding signal turns off the switching elements 13 and 14 so that the voltage is not applied between the tool electrode 1 and the work electrode 4. Namely, the timing forming unit 27 sets the duty ratio of the voltage pulse applied to the tool electrode 1 to zero. The driving device control unit 28 that receives the abnormal electrical discharge avoiding signal controls the driving device 5 to retract the tool electrode 1 upward.

o) Then, the counter 25 is cleared (S39). In order to restart the electrical discharge machining, the tool electrode 1 is moved downward, and the application of the voltage pulse to the tool electrode 1 is restarted.

Abnormal Electrical Discharge p) When the conduction is not detected (S23) and the abnormal electrical discharge is detected (S24), the counter 25 counts the abnormal electrical discharge of one time (S36). The count result is outputted to the first storage unit 24 and the operation determining unit 26.

q) The operation determining unit 26 fetches the count result stored in the first storage unit 24 to determine whether or not the abnormal electrical discharge is the consecutive second-time abnormal electrical discharge (S37). When the abnormal electrical discharge is not the consecutive second-time abnormal electrical discharge, the timing of the voltage pulse is reset (S40). Then, the flow is transferred to the application of the voltage pulse (S21).

r) When the operation determining unit 26 determines that the abnormal electrical discharge is the consecutive second-time abnormal electrical discharge, the same operation can be performed as shown in the above paragraph n).

s) Then, the counter 25 is cleared (S39). In order to restart the electrical discharge machining, the application of the voltage pulse between the tool electrode 1 and the work electrode 4 is restarted, and the tool electrode 1 is moved downward.

Short Circuit t) When the state determining unit 23 determines that the short circuit is generated (S22), the counter 25 counts the short circuit of one time (S41). The count result is outputted to the first storage unit 24 and the operation determining unit 26.

u) The operation determining unit 26 fetches the count result stored in the first storage unit 24 to determine whether or not the short circuit counted at this time is the consecutive second-time short circuit (S42).

v) When the short circuit is the consecutive second-time short circuit, the operation determining unit 26 outputs a short-circuit avoiding signal to the timing forming unit 27 and the driving device control unit 28 (S43). The timing forming unit 27 that receives the short-circuit avoiding signal turns off the switching elements 13 and 14 so that the voltage pulse is not applied between the tool electrode 1 and the work electrode 4. Namely, the timing forming unit 27 sets the duty ratio of the voltage pulse applied between the tool electrode 1 and the work electrode 4 to zero. The driving device control unit 28 that receives the short-circuit avoiding signal controls the driving device 5 to retract the tool electrode 1 upward.

w) Then, the counter 25 is cleared (S44). In order to restart the electrical discharge machining, the tool electrode 1 is moved downward, and the application of the voltage pulse between the tool electrode 1 and the work electrode 4 is restarted.

Figure 17:
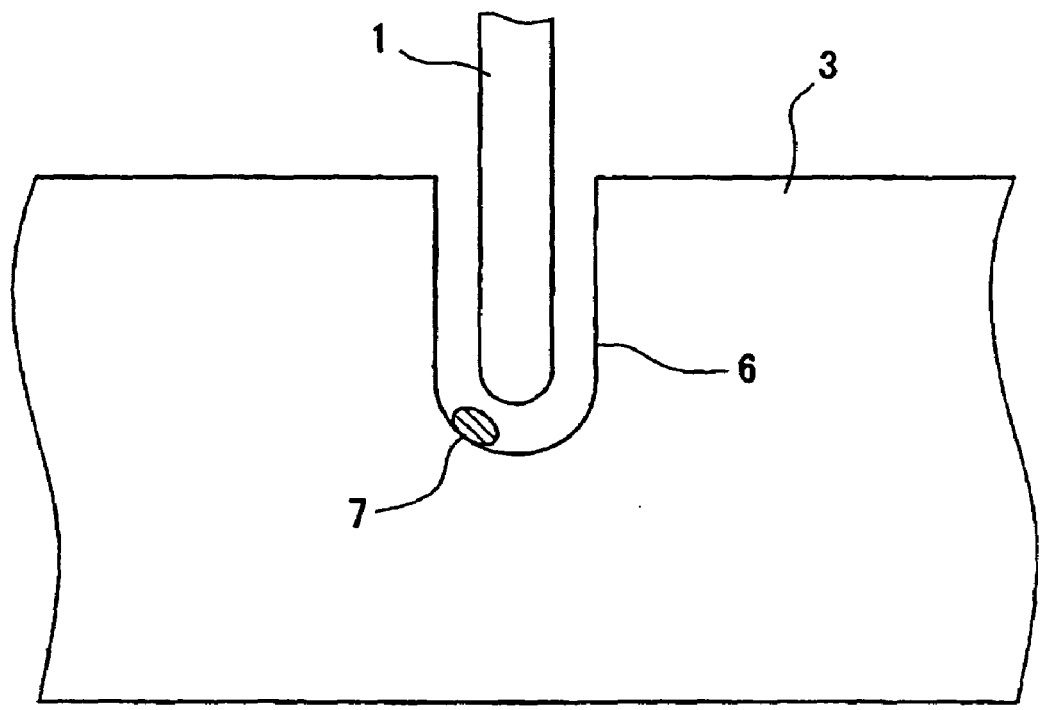
FIG. 17 is a sectional view schematically showing the tool electrode and the work.

In the electrical discharge machining method of the invention, not in the determination of each time of the electrical discharge, the abnormal electrical discharge, the conduction, and the short circuit, but only in consecutively detecting the same states, the timing forming unit 27 controls the switching elements 13 and 14 and the driving device control unit 28 controls the driving device 5. The reason will be described below. For example, as shown in FIG. 17, when the machining debris adheres to the surface of the pore 6 in the work 3 made by the electrical discharge machining and a projection portion 7 is formed, since the distance between the projection portion 7 and the tool electrode 1 is shortened, the conduction or the abnormal electrical discharge is easy to generate. However, even if the one-time conduction or the one-time abnormal electrical discharge is detected, when the projection portion 7 is melted by the conduction or the abnormal electrical discharge, the conduction or the abnormal electrical discharge is not generated in applying the next voltage pulse. Therefore, in the electrical discharge machining apparatus 20, the duty ratio of the voltage pulse is not changed when the one-time abnormal electrical discharge or the one-time conduction is detected, and the duty ratio of the voltage pulse is changed only when the consecutive two-time abnormal electrical discharges or the consecutive two-time conduction states are detected. However, it is also possible that the duty ratio of the voltage pulse applied between the tool electrode 1 and the work electrode 4 is changed only when the one-time short circuit or the one-time abnormal electrical discharge is detected. Although the number of consecutive detection times of the electrical discharge, the abnormal electrical discharge, the conduction, and the short circuit are uniformly set to two times in this embodiment, it is possible that the number of determining times is set in each of the states of the electrical discharge, the abnormal electrical discharge, the conduction, and the like. It is possible that the state is determined for a predetermined time interval to change the duty ratio of the applied voltage pulse when a frequency in which the same state is detected is increased even if the same state is not consecutively detected.

In the electrical discharge machining method of the invention, when the state determining unit 23 determines that the state is the abnormal electrical discharge or the short circuit, the driving device 5 retracts the tool electrode 1 by moving it upward. In this case, it is possible that the speed (retracting moving speed v1) and the distance (retracting moving distance d2) at which the tool electrode 4 is moved upward, and the speed at which the tool electrode 1 moved upward is moved down toward the work 3 (retracting search speed v2) are changed by the machining depth d measured by the position measurement unit 30. For example, the retracting moving speed v1, the retracting moving distance d2, and the retracting search speed v2 can be defined by the following equations (1), (2), and (3) using coefficients a, b, and c.

$$v1 = a \cdot d \quad (1)$$

$$d2 = b \cdot d \quad (2)$$

$$v2 = c \cdot d \quad (3)$$

For example, as shown in Table 2, a parameter table in which a retracting moving speed coefficient a, a retracting moving distance coefficient b, and a retracting search speed coefficient c are determined by the machining depth d is stored in a second storage unit 29. When the operation determining unit 26 inputs the abnormal electrical discharge avoiding signal or the short-circuit avoiding signal to the driving device control unit 28, the driving device control unit 28 fetches the retracting moving speed coefficient a, the retracting moving distance coefficient b, and the retracting search speed coefficient c from the second storage unit 29 according to the machining depth d computed by the position measurement unit 30. The driving device control unit 28 controls the driving device 5 by the value determined according to the above equations (1) to (3).

TABLE 2

| | Machining depth d (μm) | | | | |
|---|---|---|---|---|---|
| | 0 to 9 | 10 to 29 | 30 to 49 | 50 to 99 | 100 |
| Coefficient a | 0.5 | 0.5 | 1.0 | 1.5 | 2.0 |
| Coefficient b | 0.2 | 0.5 | 1.0 | 1.1 | 1.2 |
| Coefficient c | 1.0 | 1.0 | 1.0 | 1.0 | 1.0 |

Thus, the retracting moving speed v1 of the tool electrode 1 and the like is controlled according to the machining depth d, which allows the machining time to be shortened. For example, when the retracting moving distance d2 is set to a constant value independently of the machining depth, time is wasted because the tool electrode 1 is moved beyond necessity, and there is a fear that the accuracy of machining is decreased due to the large change in machining condition. When the tool electrode 1 is retracted by the appropriate distance as described above, the machining time can be shortened and the accuracy of machining can be improved. Since the tool electrode 1 is not moved beyond necessity, the change in machining state such as the position can be also suppressed and the accuracy of machining can be improved. It is possible that the abnormal electrical discharge avoiding signal or the short-circuit avoiding signal is checked again when the tool electrode 1 is moved at the retracting search speed v2.

Third Embodiment

Figure 18:
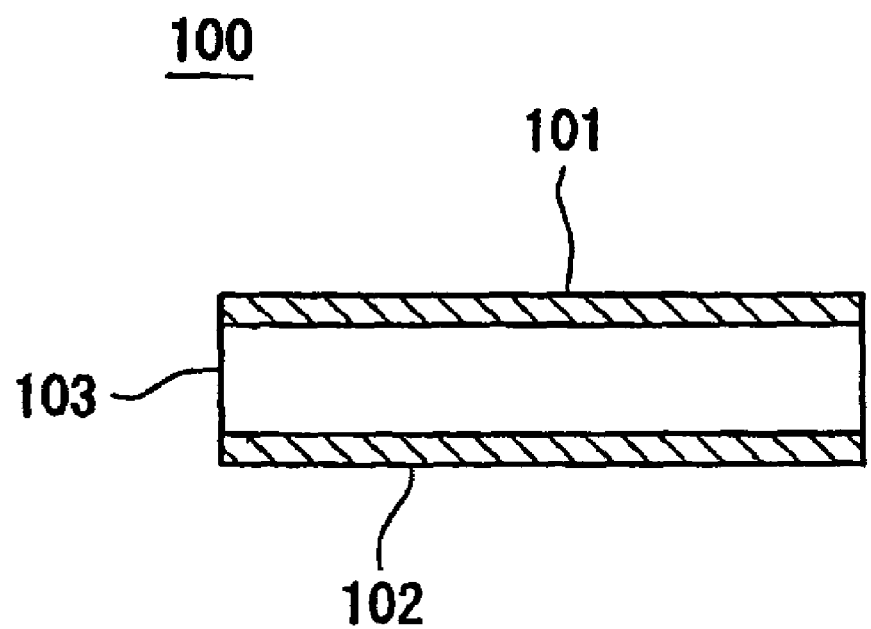
FIG. 18 is a sectional view of a metal plate whose surface has an oxide film, which is used as the work in a third embodiment of the invention.
Figure 19:
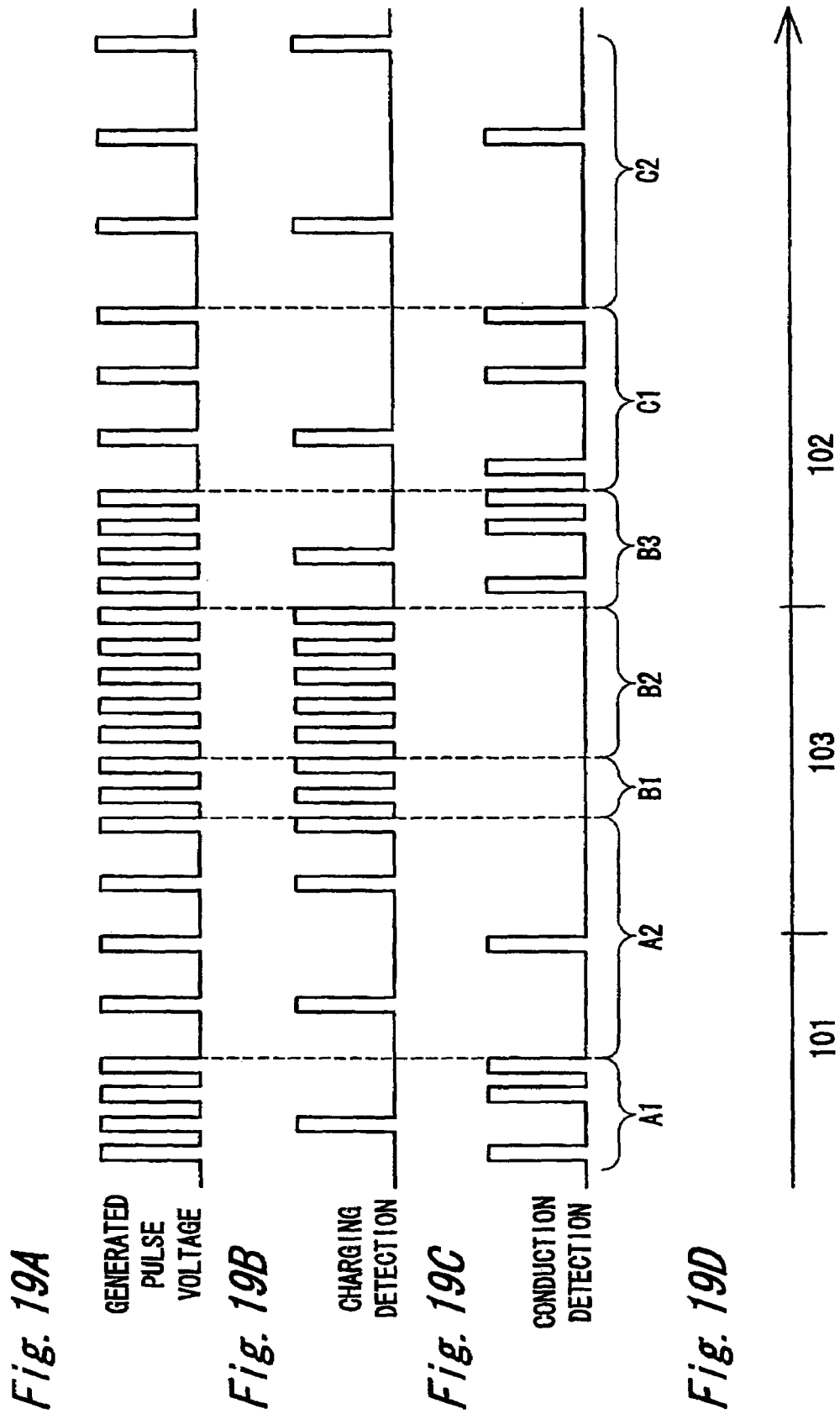
FIG. 19A is a timing chart of the voltage pulse applied in performing the electrical discharge machining to the metal plate of FIG. 18.
FIG. 19B is a timing chart of the detected electrical discharge state.
FIG. 19C is a timing chart of the detected conduction state.
FIG. 19D shows machining positions of the metal plate of FIG. 18 based on the currently detected state.
Figure 20:
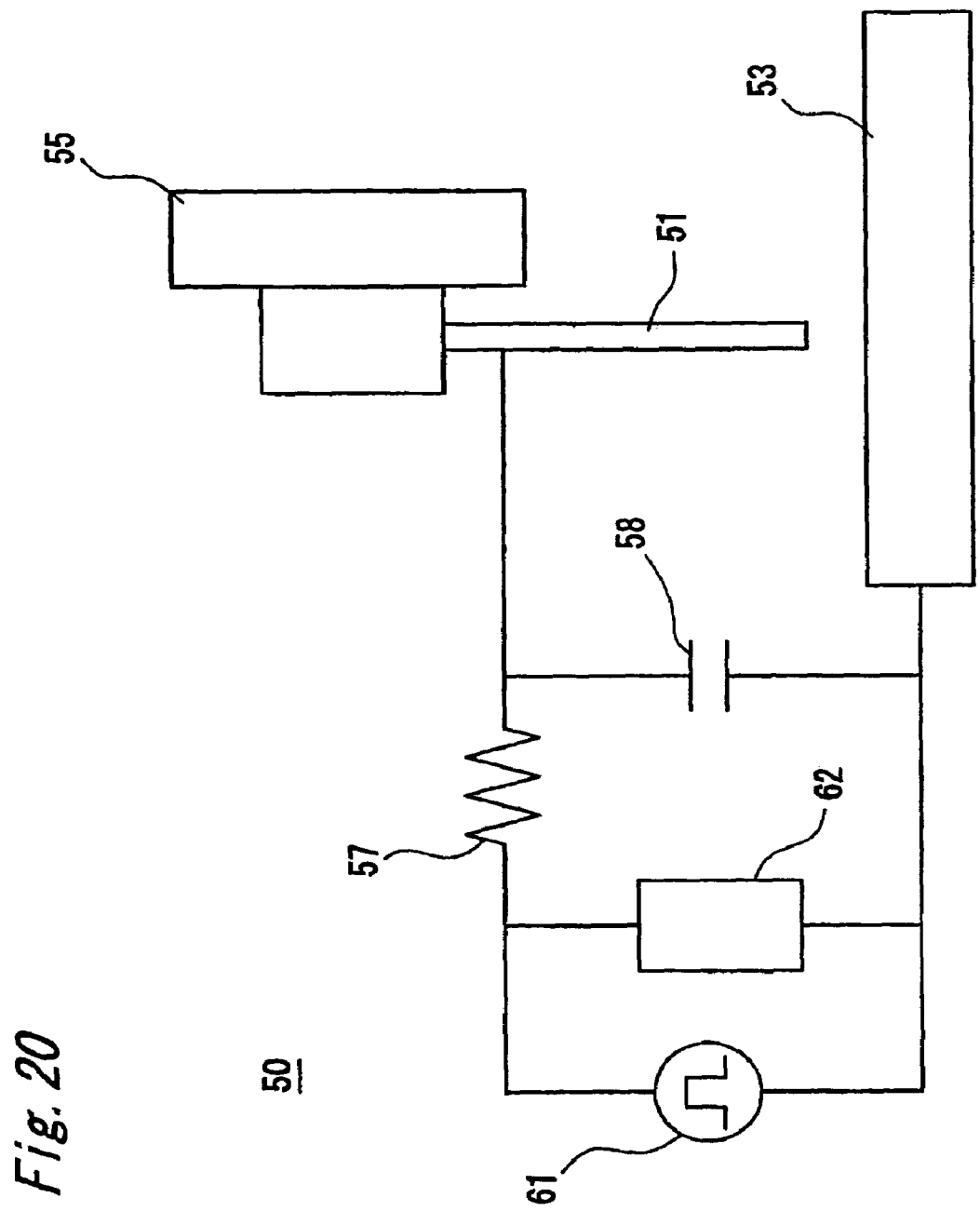
FIG. 20 is a schematic view showing a configuration of the conventional electrical discharge machining apparatus.

The case in which the electrical discharge machining of a metal plate 100 is performed to make a through-pore by adopting the electrical discharge machining method according to the invention will be described with reference to FIGS. 18 and 19. FIG. 18 is a sectional view of the metal plate 100 that has oxide films 101 and 102 on its surfaces. In this case, it is assumed that the portions that are oxidized on the surfaces of the metal plate 100 are the oxide films 101 and 102 and the portion that is not oxidized is a metal portion 103.

FIG. 19A is a timing chart of the voltage pulse applied between the tool electrode 1 and the work electrode 4. FIG. 19B shows the case in which the electrical discharge is detected for the applied voltage pulse. FIG. 19C shows the case in which the conduction is detected for the applied voltage pulse. The portions represented by zones A1 and A2 show the machining of the oxide film 101, the portions represented by zones B1, B2, and B3 show the machining of the metal portion 103, and the portions represented by zones C1 and C2 show the machining of the oxide film 102. FIG. 19D shows a point that is machined in the metal plate 100 of the work. The horizontal axes of FIGS. 19A, 19B, 19C, and 19D represent time.

A procedure of controlling the duty ratio of the voltage pulse while determining the state between the tool electrode 1 and the metal plate 100 that is of the work to perform the electrical discharge machining of the metal plate 100 will be described below.

a) The voltage pulse having the predetermined pulse duration and interval is applied (zone A1). In this case, because electrical conductivities of the oxide films 101 and 102 are lower than the electrical conductivity of the metal portion 103, when the machining of the oxide film 101 is started, the electrical discharge is difficult to generate with respect to the voltage application to the tool electrode 1. When the electrical discharge is not generated, the working fluid 2 is ionized, so that the conduction is frequently detected. As a result, after the consecutive two-time conduction states are detected, the duty ratio of the voltage pulse is changed. In this case, the control unit 12a changes the timing of the switching of the switching elements 13 and 14, and the interval of the voltage pulse is broadened.

b) The voltage pulse whose interval is broadened as compared with the zone A1 is applied (zone A2). As shown in FIG. 19A, in the interval of the voltage pulse after the switching timing is changed, the switching timing is doubled (integral multiple) when compared with the interval of the voltage pulse before the switching timing is changed. When the interval of the voltage pulse is broadened, since the ionization of the working fluid is suppressed, the number of detected times of conduction is decreased. In a second half of the zone A2, because the machining of the oxide film 101 is ended and the machining of the metal portion 103 is started, the electrical discharge is detected in each application of the voltage pulse and the conduction is not detected. After the consecutive two-time electrical discharges are detected, the duty ratio of the voltage pulse is changed. In this case, the interval of the voltage pulse is narrowed.

c) The voltage pulse whose interval is narrowed as compared with the zone A2 is applied (zones B1 and B2). In this case, because the metal portion 103 is machined, the electrical discharge is detected in each application of the voltage pulse and the conduction is not detected. Therefore, the machining time can be shortened and the machining efficiency can be improved. When the interval of the voltage pulse can further be narrowed, it is possible that the duty ratio is changed in multiple stages.

d) The voltage pulse having the same interval as the zones B1 and B2 is applied (zone B3). As the machining depth is increased, the amount of floating materials of the machining debris and the adhesion of the machining debris to the metal plate 100 are increased, and the conduction or the abnormal electrical discharge is easy to generate. When the conduction or the abnormal electrical discharge is detected, the further generation of the conduction or the abnormal electrical discharge is suppressed by broadening the interval of the voltage pulse to the tool electrode 1 or by moving the tool electrode 1 upward. In the second half of the zone B3, after the consecutive two-time conduction states are detected, the duty ratio of the voltage pulse is changed. In this case, the interval of the voltage pulse is broadened.

e) The voltage pulse whose interval is broadened as compared with the zone B3 is applied (zone C1). When the machining point enters the oxide film 102 from the metal portion 103, even if the voltage pulse is applied between the tool electrode 1 and the work electrode 4, the electrical discharge is difficult to generate, and the conduction is easy to generate. In the second half of the zone C1, after the consecutive two-time conduction states are detected, the duty ratio of the voltage pulse is changed. In this case, the interval of the voltage pulse is further broadened.

f) The voltage pulse whose interval is broadened as compared with the zone C1 is applied (zone C2).

Thus, the electrical discharge machining of the metal plate 100 can be performed by controlling the duty ratio of the applied voltage pulse while determining the state between the tool electrode 1 and the metal plate 100. When the machining depth is increased, the abnormal electrical discharge is easy to generate. In the electrical discharge machining apparatus of the invention, the generation of the abnormal electrical discharge or the conduction is suppressed by moving the tool electrode 1 upward or by lengthening the interval of the voltage pulse.

Although the direct-current power supply 11 is used in the embodiments of the invention, an alternating-current power supply may be used as the power supply of the invention. It may also be possible to use a pulse power supply such as a rectangular-pulse power supply. When the pulse power supply including the reference pulse generator is used, it is possible that the timing of the switching of the switching elements 13 and 14 is synchronized with a rise edge or a fall edge of the reference pulse. For example, the switching of the switching element 14 is synchronized with the rise edge of the reference pulse, and the switching of the switching element 13 is synchronized with the fall edge of the reference pulse. Therefore, a voltage pulse having the same pulse duration as the reference pulse can be generated. At this point, the interval of the voltage pulse can be changed by synchronizing for each of a plurality of reference pulses, which allows the duty ratio of the voltage pulse to be changed. The switching of the switching element 14 is performed in synchronization with the rise edge of the reference pulse, and the switching of the switch element 13 is performed after the predetermined time shorter than the pulse duration of the reference pulse elapses. Therefore, the voltage pulse having the pulse duration shorter than that of the reference pulse can be generated. It is possible that the reference pulse generator is provided in the portion such as the timing forming unit 27 except for the power supply.

Fourth Embodiment

In the above embodiments using deionized water as the working fluid, the pulse duration of the voltage pulse applied between the tool electrode and the work is shortened, so that efficiency of the electrical discharge machining can be improved.

According to an electrical discharge machining apparatus of the forth embodiment of the invention, high accuracy machining of surface roughness can be provided by appropriately setting an applied voltage, a voltage pulse duration, and a number of applied times between the tool electrode and the work.

Figure 21A:
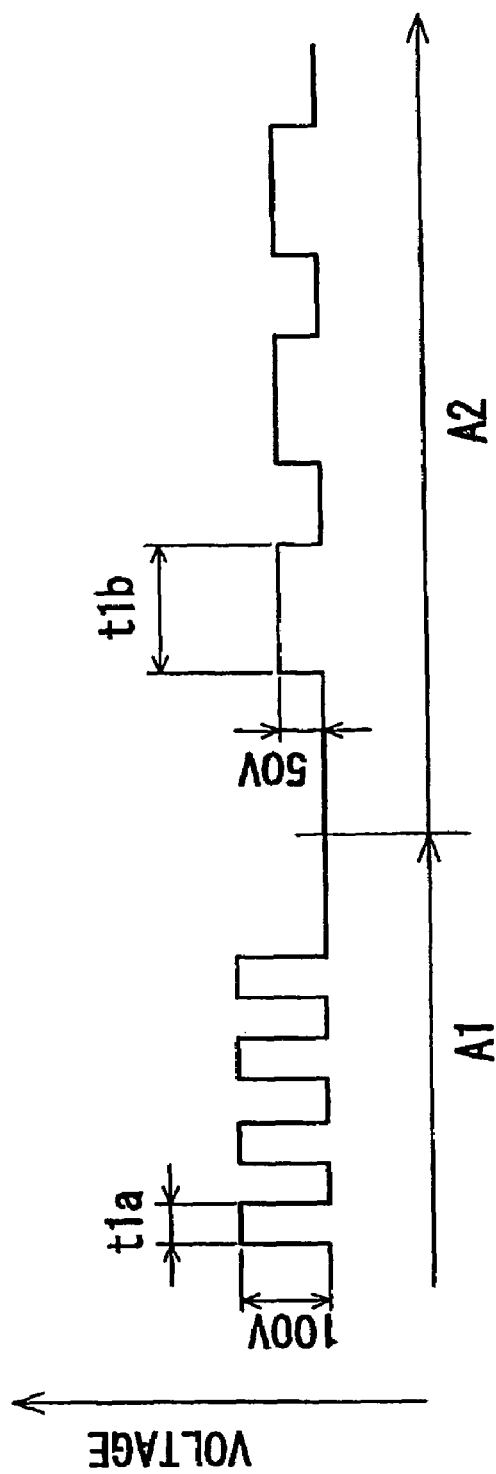
FIG. 21A is a timing chart of the voltage pulse applied between the tool electrode and the work according to a fourth embodiment of the invention.
Figure 21B:
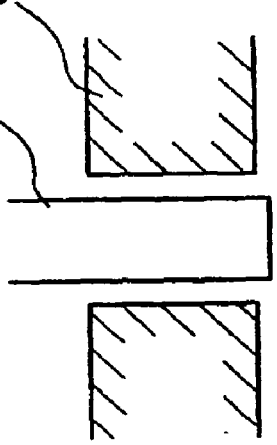
FIG. 21B is a sectional view of the tool electrode and the work during zone A1 of FIG. 21A.
Figure 21C:
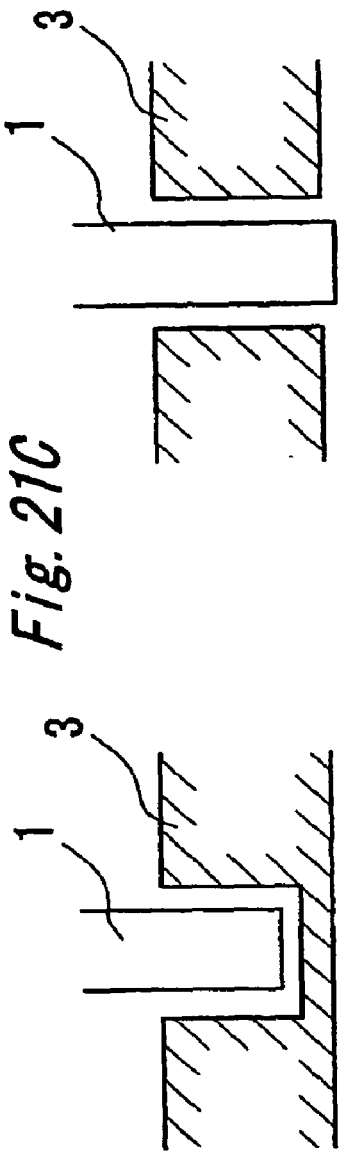
FIG. 21C is a sectional view of the tool electrode and the work during zone A2 of FIG. 21A.

The electrical discharge machining apparatus according to the fourth embodiment includes the circuit configuration substantially equal to the circuit configuration of the electrical discharge machining apparatus of FIG. 2. When a hole will be made in the work 3 as shown in FIG. 9A, a voltage pulse is applied between the tool electrode 1 and the work 3 according to the timing chart of voltage pulse shown in FIG. 21A. FIG. 21A is a timing chart of the voltage pulse applied between the tool electrode and the work according to the fourth embodiment. FIG. 21B is a sectional view of the tool electrode and the work during zone A1 of FIG. 21A. FIG. 21C is a sectional view of the tool electrode and the work during zone A2 of FIG. 21A. It is noted that the pulse duration t1$a$ is about a few ten nano-sec and the pulse duration t1$b$ is about a few micro-sec.

In the zone A1, the voltage pulse having pulse duration of a few ten nano-sec and a voltage of 100 V is applied between the tool electrode 1 and the work 3 to cause electrical discharge machining so that a pore is made as shown in FIG. 21B as described in the first embodiment. Then, a high accuracy of surface roughness can be provided.

After passing completely though the other side, in the zone A2, while the distance between the tool electrode 1 and the work 3 is kept constant, a voltage pulse having a pulse duration of a few hundred nano-sec to a few micro-sec and a voltage of 50 V, at which electrical discharge machining can not be caused, are applied appropriately several times. The applied pulse conditions, such as pulse duration, voltage, and amounts of pulse, may be appropriately set. Then, ionizing the surface of the work 3 can be controlled to perform electric chemical machining of only the surface of the work 3 so that surface roughness of a wall surface of the pore can be improved as shown in FIG. 21C. FIG. 21C has the perforated pore. However, the applied pulse conditions are controlled so that the surface roughness of the wall surface of the non-perforated pore can be improved.

It is noted that the work electrode may be electrically identified with the work. Then, the work electrode may be replaced with the work.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined by the appended claims, unless they depart therefrom.

What is claimed is:

1. An electrical discharge machining apparatus comprising:
    a work electrode adapted to support a work immersed in a working fluid;
    a tool electrode located opposite to said work electrode with a predetermined gap;
    a capacitor that is connected between said work electrode and said tool electrode to provide a series of voltage pulses;
    a charging circuit having a power supply and a first switching element which are connected in series to said capacitor;
    a charge regulating circuit having a second switching element connected in series to said capacitor; and
    a control unit for controlling said first and second switching elements, such that said first switching element turns on, and then said second switching element turns on before said first switching element turns off, whereby one voltage pulse, having a leading edge corresponding to the turning on of said first switching element and a trailing edge corresponding to the turning on of said second switching element, is generated.

2. The electrical discharge machining apparatus according to claim 1, wherein said control unit is operable to control a switching timing of each of said first and second switching elements.

3. The electrical discharge machining apparatus according to claim 1, further comprising:
    a measurement unit for measuring at least one of voltage and current between said tool electrode and the work; and a state determining unit for determining a state between said tool electrode and the work on the basis of a measurement result performed by said measurement unit, wherein said control unit is operable to control the switching timing of each of said first and second switching elements according to the state determined by said state determining unit.

4. The electrical discharge machining apparatus according to claim 3, wherein said state determining unit is operable to determine, in response to each voltage pulse, that the state between said tool electrode and the work is any one of an electrical discharging state, an abnormal electrical discharging state, an ion conducting state, a short circuiting state, and a no conduction state.

5. The electrical discharge machining apparatus according to claim 4, wherein said control unit is operable to change the switching timing of each of said first and second switching elements when said state determining unit determines that the same state is repeated consecutively.

6. The electrical discharge machining apparatus according to claim 1, wherein said first switching element and said second switching element are power switching elements.

7. The electrical discharge machining apparatus according to claim 1, wherein the working fluid is deionized water.

8. The electrical discharge machining apparatus according to claim 1, wherein said tool electrode is formed by a plurality of pins.

9. An electrical discharge machining apparatus comprising:

a work electrode adapted to support a work immersed in a working fluid;

a tool electrode located opposite to said work electrode with a predetermined gap;

a voltage pulse applying unit for applying a series of voltage pulses, having a predetermined pulse duration and frequency, between said work electrode and said tool electrode;

a measurement unit for measuring at least one of voltage and current between said tool electrode and said work electrode;

a state determining unit for determining a state between said tool electrode and the work based on an output of said measurement unit; and a control unit for controlling at least one of the pulse duration and frequency of the voltage pulse based on an output of said state determining unit, wherein said voltage pulse applying unit comprises:

a capacitor that is connected between said work electrode and said tool electrode to provide a series of voltage pulses;

a charging circuit having a power supply and a first switching element which are connected in series to said capacitor; and a charge regulating circuit having a second switching element connected in series to said capacitor, and wherein said control unit is operable to control said first and second switching elements, such that said first switching element turns on, and then said second switching element turns on before said first switching element turns off, whereby one voltage pulse, having a leading edge corresponding to the turning on of said first switching element and a trailing edge corresponding to the turning on of said second switching element, is generated.

* * * * *